United States Patent
Rocklin et al.

(10) Patent No.: US 10,360,648 B1
(45) Date of Patent: Jul. 23, 2019

(54) SYNCHRONIZING KDS FUNCTIONALITY WITH POS WAITLIST GENERATION

(71) Applicant: Square, Inc., San Francisco, CA (US)

(72) Inventors: William Rocklin, San Francisco, CA (US); Christopher Philip Renke, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 304 days.

(21) Appl. No.: 15/189,131

(22) Filed: Jun. 22, 2016

(51) Int. Cl.
*G06Q 50/12* (2012.01)
*G06Q 20/20* (2012.01)
*G06Q 30/06* (2012.01)
*A47F 10/06* (2006.01)

(52) U.S. Cl.
CPC .......... *G06Q 50/12* (2013.01); *G06Q 20/202* (2013.01); *G06Q 30/0635* (2013.01); *A47F 10/06* (2013.01)

(58) Field of Classification Search
CPC ...... G06Q 10/00; G06Q 10/02; G06Q 20/367; G06Q 20/202; G06Q 20/204; G06Q 20/0453; G06Q 30/016; G06Q 20/325
USPC .......................................................... 705/15
See application file for complete search history.

(56) References Cited

U.S. PATENT DOCUMENTS

| | | | |
|---|---|---|---|
| 4,485,300 A | 11/1984 | Peirce | |
| 6,373,950 B1 | 4/2002 | Rowney | |
| 6,727,925 B1 * | 4/2004 | Bourdelais | G06T 19/00 715/850 |
| 6,732,934 B2 | 5/2004 | Hamilton et al. | |
| 6,920,431 B2 | 7/2005 | Showghi et al. | |
| 7,071,842 B1 | 7/2006 | Brady, Jr. | |
| 7,536,307 B2 | 5/2009 | Barnes et al. | |
| 7,571,468 B1 | 8/2009 | Williams | |
| 7,685,052 B2 | 3/2010 | Waelbroeck et al. | |
| 7,748,621 B2 | 7/2010 | Gusler et al. | |
| 7,756,745 B2 * | 7/2010 | Leet | G06Q 10/02 705/15 |
| 7,797,204 B2 | 9/2010 | Balent | |
| 7,805,382 B2 | 9/2010 | Rosen et al. | |
| 7,958,029 B1 | 6/2011 | Bobich et al. | |

(Continued)

OTHER PUBLICATIONS

Mercury, "Bar Tabs and Credit Cards: The Mixology for POS Developers," Credit Card Acceptance Procedures When Supporting Bar Tabs, pp. 1-9 (May 29, 2014).

(Continued)

*Primary Examiner* — Andrew Joseph Rudy
(74) *Attorney, Agent, or Firm* — Lee & Hayes, P.C.

(57) ABSTRACT

Techniques and arrangements for synchronizing kitchen display system functionality with point-of-sale (POS) waitlist generation. In some examples, a POS device generates a waitlist using both front of the house data (e.g., data associated the POS device) and back of the house data (e.g., data associated with the kitchen display system). For instance, the POS device can receive input associated with transactions between a merchant and customers. The POS device can then generate a waitlist based on the input. Additionally, the POS device can receive data associated with order tickets from the kitchen display system. Based on receiving the data, the POS device can update the waitlist using the data. In some examples, the POS device updates the waitlist by determining a state associated with each of the transactions, and the updating wait times for the transactions based on the states.

20 Claims, 16 Drawing Sheets

(56) References Cited

U.S. PATENT DOCUMENTS

| | | | |
|---|---|---|---|
| 8,123,370 B2* | 2/2012 | Maekawa | G02B 5/124 |
| | | | 353/99 |
| 8,190,483 B2* | 5/2012 | Woycik | G06Q 20/367 |
| | | | 705/26.1 |
| 8,370,207 B2 | 2/2013 | Edwards | |
| 8,671,002 B2 | 3/2014 | Stefik et al. | |
| 8,676,708 B1 | 3/2014 | Honey | |
| 8,694,456 B2 | 4/2014 | Grigg et al. | |
| 8,700,659 B2* | 4/2014 | Skeen | G06F 3/0484 |
| | | | 707/754 |
| 8,732,193 B2 | 5/2014 | Skeen et al. | |
| 8,762,207 B2* | 6/2014 | Kobres | G06Q 30/0226 |
| | | | 705/15 |
| 8,799,111 B2 | 8/2014 | Prellwitz et al. | |
| 8,856,170 B2* | 10/2014 | Skeen | G06F 17/30752 |
| | | | 705/14.23 |
| 8,862,504 B2 | 10/2014 | Sobek | |
| 9,002,584 B2 | 4/2015 | Van Wiemeersch et al. | |
| 9,037,491 B1 | 5/2015 | Lee | |
| 9,064,359 B2* | 6/2015 | Lert, Jr. | G06Q 30/016 |
| 9,195,982 B2 | 11/2015 | Orr et al. | |
| 9,218,413 B2* | 12/2015 | Skeen | G06F 17/30752 |
| 9,349,108 B2* | 5/2016 | Skeen | G06Q 10/02 |
| 9,355,470 B2* | 5/2016 | Merrell | G06T 11/00 |
| 9,390,424 B2* | 7/2016 | Hendrickson | G06Q 10/00 |
| 9,409,978 B2 | 8/2016 | Doxsey et al. | |
| 9,430,784 B1 | 8/2016 | Frederick et al. | |
| 9,515,999 B2 | 12/2016 | Ylonen | |
| 9,536,243 B2 | 1/2017 | Khan | |
| 9,569,757 B1* | 2/2017 | Wilson | G06Q 20/0453 |
| 9,576,289 B2 | 2/2017 | Henderson et al. | |
| 9,582,797 B1* | 2/2017 | Holmes | G06Q 20/325 |
| 9,633,344 B2 | 4/2017 | Nathanel et al. | |
| 9,666,023 B2 | 5/2017 | Irwin, Jr. | |
| 9,734,463 B2* | 8/2017 | Skeen | G06F 17/30389 |
| 9,785,930 B1* | 10/2017 | Terra | G06Q 20/204 |
| 9,799,028 B2 | 10/2017 | Dickelman | |
| 9,799,380 B2 | 10/2017 | Liabraaten | |
| 9,817,646 B1 | 11/2017 | Chen et al. | |
| 9,824,233 B2 | 11/2017 | Kaplan et al. | |
| 9,824,408 B2 | 11/2017 | Isaacson et al. | |
| RE46,731 E* | 2/2018 | Woycik | |
| 9,922,324 B2 | 3/2018 | Wilson et al. | |
| 9,959,529 B1 | 5/2018 | Varma et al. | |
| 9,965,755 B2 | 5/2018 | Richelson et al. | |
| 9,972,003 B2 | 5/2018 | Mooring, II et al. | |
| 10,007,953 B1 | 6/2018 | Nathoo et al. | |
| 10,019,149 B2 | 7/2018 | Chirakan et al. | |
| 10,032,171 B2 | 7/2018 | Yeager | |
| 10,043,162 B1 | 8/2018 | Renke et al. | |
| 10,043,209 B2 | 8/2018 | Cooke et al. | |
| 10,055,722 B1* | 8/2018 | Chen | G06Q 20/202 |
| 10,068,272 B1 | 9/2018 | Varma et al. | |
| 10,091,617 B2* | 10/2018 | Chicoine | H04W 4/023 |
| 2004/0243468 A1 | 12/2004 | Cohagan et al. | |
| 2006/0178986 A1 | 8/2006 | Giordano et al. | |
| 2008/0015987 A1 | 1/2008 | Ramavarjula et al. | |
| 2008/0313047 A1 | 12/2008 | Casares et al. | |
| 2008/0319914 A1 | 12/2008 | Carrott | |
| 2009/0063312 A1 | 3/2009 | Hurst | |
| 2009/0065572 A1 | 3/2009 | Jain | |
| 2009/0083069 A1 | 3/2009 | Tierney et al. | |
| 2009/0090783 A1 | 4/2009 | Killian et al. | |
| 2009/0157518 A1 | 6/2009 | Bishop et al. | |
| 2009/0192913 A1 | 7/2009 | Saito et al. | |
| 2009/0228336 A1 | 9/2009 | Giordano et al. | |
| 2010/0010906 A1 | 1/2010 | Grecia | |
| 2010/0088207 A1 | 4/2010 | McLaughlin et al. | |
| 2010/0174620 A1 | 7/2010 | Stringfellow et al. | |
| 2010/0217674 A1 | 8/2010 | Kean | |
| 2011/0022472 A1 | 1/2011 | Zon | |
| 2011/0087592 A1 | 4/2011 | van der Veen et al. | |
| 2011/0215159 A1 | 9/2011 | Jain | |
| 2011/0238510 A1 | 9/2011 | Rowen et al. | |
| 2011/0251892 A1 | 10/2011 | Laracey | |
| 2011/0251909 A1 | 10/2011 | Clark | |
| 2011/0288967 A1 | 11/2011 | Selfridge | |
| 2011/0320345 A1 | 12/2011 | Taveau et al. | |
| 2012/0130787 A1 | 5/2012 | Stouffer et al. | |
| 2012/0130899 A1 | 5/2012 | McMonagle et al. | |
| 2012/0209749 A1 | 8/2012 | Hammad et al. | |
| 2012/0330837 A1 | 12/2012 | Persaud et al. | |
| 2013/0226805 A1 | 8/2013 | Griffin et al. | |
| 2013/0238455 A1 | 9/2013 | Laracey | |
| 2014/0244409 A1 | 8/2014 | Nathanel et al. | |
| 2014/0279534 A1 | 9/2014 | Miles | |
| 2014/0351130 A1 | 11/2014 | Cheek et al. | |
| 2015/0033286 A1 | 1/2015 | Shahidzadeh et al. | |
| 2015/0095225 A1 | 4/2015 | Appana et al. | |
| 2015/0120345 A1 | 4/2015 | Rose | |
| 2015/0242854 A1 | 8/2015 | Hayhow | |
| 2015/0287006 A1 | 10/2015 | Hunter et al. | |
| 2016/0307176 A1 | 10/2016 | Renke et al. | |
| 2016/0335613 A1 | 11/2016 | Laracey | |
| 2017/0083901 A1 | 3/2017 | Spencer, II | |
| 2017/0124671 A1 | 5/2017 | Tam et al. | |
| 2018/0039965 A1* | 2/2018 | Han | G06F 3/0481 |
| 2018/0181937 A1 | 6/2018 | Wilson et al. | |

OTHER PUBLICATIONS

Non-Final Office Action dated Jun. 25, 2015, for U.S. Appl. No. 14/675,555, of Renke, C.P., et al., filed Mar. 31, 2015.

Final Office Action dated Dec. 31, 2015, for U.S. Appl. No. 14/675,555, of Renke, C.P., et al., filed Mar. 31, 2015.

Non Final Office Action dated Dec. 16, 2016, for U.S. Appl. No. 14/675,555, of Renke, C.P., et al., filed Mar. 31, 2015.

Non Final Office Action dated Jan. 18, 2017, for U.S. Appl. No. 14/675,565, of Renke, C.P., et al., filed Mar. 31, 2015.

Final Office Action dated Jul. 26, 2017, for U.S. Appl. No. 14/675,555, of Renke, C.P., et al., filed Mar. 31, 2015.

Advisory Action dated Nov. 8, 2017, for U.S. Appl. No. 14/675,555, of Renke, C.P., et al., filed Mar. 31, 2015.

Final Office Action dated Dec. 14, 2017, for U.S. Appl. No. 14/675,565, of Renke, C.P., et al., filed Mar. 31, 2015.

Non Final Office Action dated Feb. 27, 2018, for U.S. Appl. No. 14/675,555, of Renke, C.P., et al., filed Mar. 31, 2015.

Notice of Allowance dated Mar. 29, 2018, for U.S. Appl. No. 14/675,565, of Renke, C.P., et al., filed Mar. 31, 2015.

Non Final Office Action datd Jun. 19, 2018, for U.S. Appl. No. 15/905,643, of Wilson, M., et al., filed Feb. 26, 2018.

Non Final Office Action dated Aug. 14, 2018, for U.S. Appl. No. 15/185,354, of Bell, B., et al., filed Jun. 17, 2016.

Non Final Office Action dated Aug. 15, 2018, for U.S. Appl. No. 15/185,383, of Bell, B., et al., filed Jun. 17, 2016.

Final Office Action dated Sep. 4, 2018, for U.S. Appl. No. 14/675,555, of Renke, C.P., et al., filed Mar. 31, 2015.

Non Final Office Action dated Oct. 2, 2018, for U.S. Appl. No. 15/195,557, of Abrons, A., et al., filed Jun. 28, 2016.

* cited by examiner

SYNCHRONIZING KDS FUNCTIONALITY WITH POS WAITLIST GENERATION

BACKGROUND

Currently, a merchant can utilize a point-of-sale (POS) device to create waitlists for customers at the merchant's locations. To create a waitlist, the POS device uses data associated with front of house operations for the merchant. For instance, the POS device uses data indicating when one or more customers were seated at each of the tables within the merchant's location. The POS device then uses data indicating average turn times associated with the tables in order to calculate times for the waitlist.

Since the POS device only uses front of the house data to perform such calculations, many waitlists are inaccurate. For instance, the average turn times associated with each of the tables may vary greatly based on factors that include: (1) the number of customers at a respective table, (2) the number of orders the customers at the respective table make during a transaction, (3) the types of items that are included in each of the orders, and (4) preparation times for the items that are included in each of the orders.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
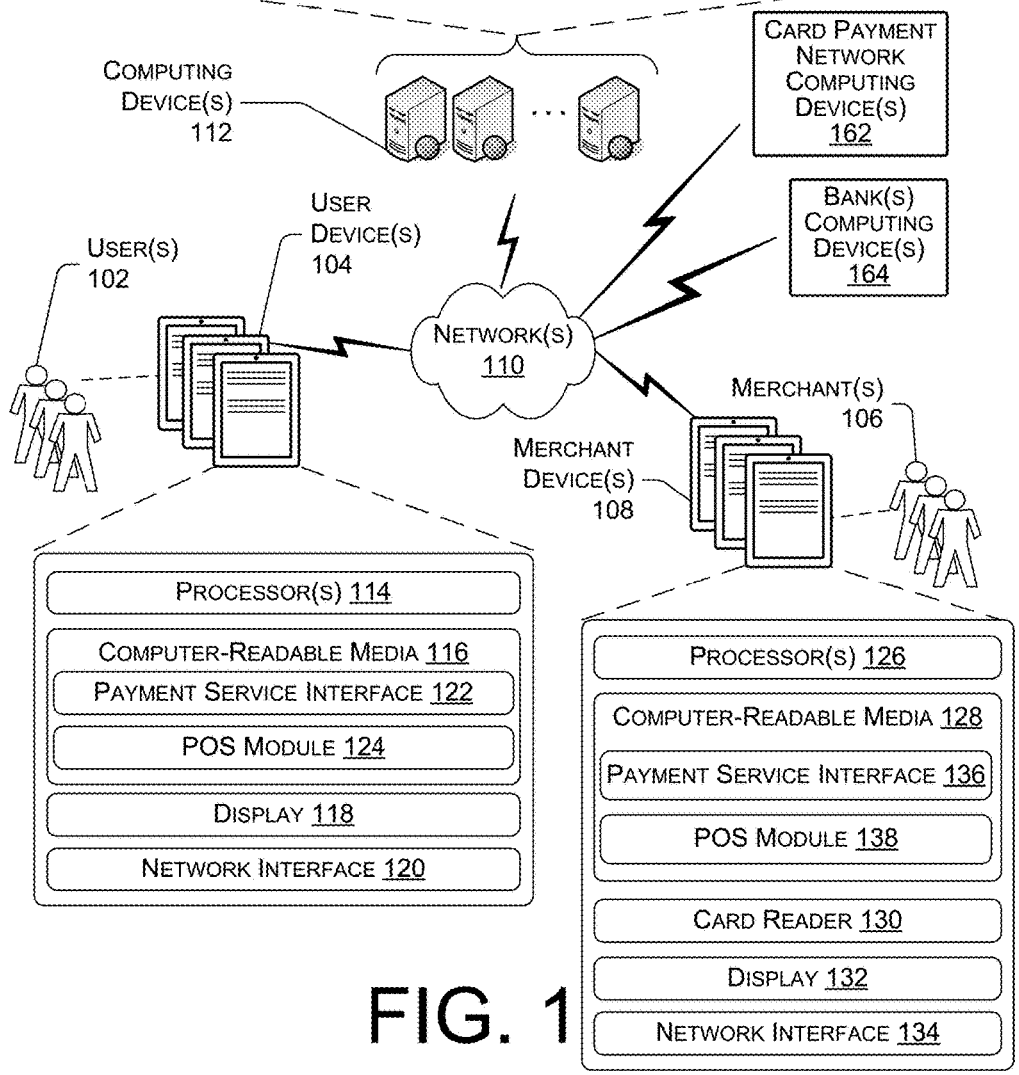
FIG. 1 illustrates an example system for handling transactions among customers and merchants.

This disclosure describes systems and processes for synchronizing kitchen display system functionality with POS waitlist generation. In some examples, a POS device associated with a merchant can receive input indicating locations within the merchant's location that customers are seated. For instance, the merchant can include tables located at specific locations within the merchant's locations. The input can indicate which of the tables are currently occupied by customers and which of the tables are currently not occupied by customers. For instance, the POS device can receive first input when one or more customers are seated at a table. The POS device can then receive second input when the one or more customers are finished and leave the table (e.g., the POS device processes a transaction associated with the one or more customers).

In some examples, the POS device can further receive input associated with transactions between the merchant and the customers. The POS device can then generate open tickets for the transactions based on the input. An open ticket is a data structure that stores information associated with interactions between the merchant and customers during the course of a transaction. The interactions can include an identity of the merchant, a location of the merchant, identities of the customers, items ordered by the customers during the transaction, timestamps for each of the items ordered by the customers during the transaction, a cost associated with each of items, a total cost of the items, or the like. In some examples, the open ticket data structures can further include versioning data structures that the POS device uses when synchronizing the open ticket data structures with other merchant devices. For instance, the versioning data structures can include vectors that indicate each time the open ticket data structures are updated by the POS device.

For instance, the POS device can generate an open ticket for a transaction when customers are seated at a table within the merchant's location. The open ticket can include a versioning data structure that includes a count of one indicating that the open ticket is new. During the transaction, the POS device can receive input indicating items ordered by the customers. Based on the input, the POS device can add data associated with the items to the open ticket (e.g., store data in the data structure). The POS device can further update the versioning data structure each time the POS device adds data to the open ticket. The POS device can then process the transaction for a cost of the open ticket at the end of the transaction.

In some examples, the POS device synchronizes with a kitchen display system. For instance, the POS device can send data associated with open tickets to the kitchen display system. Additionally, the POS device can receive data associated with order tickets that the kitchen display system creates for the transactions. An order ticket can include a data structure that indicates one or more items that are currently in-progress of being prepared by the kitchen. In some examples, the POS device and the kitchen displays system synchronize each time one of the POS device and/or the kitchen display system receives input. In some examples, the POS device and the kitchen displays system synchronize at given time intervals.

While conducting transactions with customers, the merchant's location may become filled to capacity with customers. For instance, in some examples, each of the tables at the merchant's location may be occupied by one or more customers. Additionally or alternatively, in some examples, a portion of the tables at the merchant's location may be occupied by one or more customers while the rest of the tables may be reserved by one or more other customers. In either case, based on the merchant's location being filled to capacity, the POS device can generate a waitlist for the merchant. In some examples, a waitlist can include a data structure that stores wait times for one or more locations within the merchant's location.

In some examples, the POS device generates the waitlist using both front of the house data (e.g., data associated the POS device) and back of the house data (e.g., data associated with the kitchen display system). For instance, the POS device can use front of the house data to calculate estimated wait times for a waitlist. The front of the house data can include data indicating when customers were seated at one or more tables at the merchant's location, reservation times for one or more of the tables at the merchant's location, average turn times for each of the tables at the merchant's locations, or the like. In some examples, the POS device can then update the estimated wait times for the waitlist using back of the house data from the kitchen display system. The back of the house data can include data indicating orders made by customers at one or more of the tables, a progress (e.g., estimated time remaining for preparation) of the orders made by the customers, or the like. After generating the waitlist, the POS device can provide the waitlist via a POS user interface.

It should be noted that, in some examples, a third-party service (e.g., payment service) can generate the waitlist for the merchant. For instance, the third-party service can receive the front of the house data from the POS device and the back of the house data from the kitchen display system. The third-party service can then calculate wait times for the waitlist using the front of the house data and the back of the house data. After generating the waitlist, the third-party service can send data associated with the waitlist to the POS device. The POS device can receive the data associated with the waitlist from the third-party service and based on receiving the data, provide the waitlist to the merchant.

By synchronizing the front of the house data of the POS device with the back of the house data of the kitchen display system to generate waitlists, the systems and processes described herein improve both hardware and software on merchant devices that generate waitlists. For instance, calculations that are used for generating waitlists are more accurate since the calculations are integrating the front of the house data (e.g., data associated the POS device) with the back of the house data (e.g., data associated with the kitchen display system). Additionally, in some examples, waitlists can be updated in real-time using data that is synchronized between the POS device and the kitchen display system. As such, in such examples, the waitlists provided by the POS device stay current while the merchant conducts transactions with customers.

FIG. 1 illustrates an example system 100 for handling transactions among customers and merchants. More particularly, FIG. 1 provides a framework for providing synchronization of kitchen display functionality with POS functionality when generating waitlists for merchants. In some examples, each of the merchant devices of FIG. 1 can include different hardware and/or software based on a type of merchant device (e.g., a POS device, kitchen display system, and/or counter device).

As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116, a display 118 and a network interface 120. The computer-readable media 116 may store a payment service interface 122 and a POS module 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS module 138. The computing device(s) 112 may also include one or more processor(s) 140, computer-readable media 142 and a network interface 144. The computer readable media 142 may store a user interaction module 146, a merchant interaction module 148, a payment module 150, a waitlist module 152, and a database 154.

In some implementations, one of the users 102 may operate a user device 104 to perform various functions associated with the user device 104. For example, a user of the user(s) 102 may utilize the user device 104, and particularly the payment service interface 122 thereof, to interact with the computing device(s) 112 via the network interface 120 to establish a user account with the payment service of the computing device(s) 112. In addition, a user of the user(s) 102 may utilize POS module 124 of the user device 104 to interface with the POS module 138 of the merchant device(s) 108, e.g. as part of a transaction using the payment service of the computing device(s) 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing device(s) 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS module 124 of the user device 104 to execute the payment from the user 102 to the merchant 106 through the payment service of the computing device(s) 112. Further, the POS module 138 may control the operation of the card reader 130 to read payment information from credit cards, debit cards, gift cards and the like. Moreover, the POS module 138 may operate to interact with the card payment network computing devices(s) 162 and/or bank(s) computing device(s) 164 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150, the waitlist module 152, and the database 154. The database 154 may store various information including user account information 156, merchant information 158, and waitlist(s) 160.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 154, such as the user account information 156 and merchant information 158 to provide handling of payments between merchants and users. In some implementations, user account information 156 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing device(s) 112. The merchant 106 can interact with the merchant device 108 to process the transaction. In some examples, the service of the computing devise 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During pointof-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the user(s) 102 and the merchant(s) 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing device(s) 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing device(s) 112. The user 102 can create the user account, for example, by interacting with an application of the user device 104 that is configured to perform electronic payment transactions and that may execute on the user device 104 (e.g. the payment service interface 122). When creating an electronic payment account with the service of the computing device(s) 112, the user 102 may provide an image including the face of the user, data describing a financial account of the user 102 (e.g., a credit card number, expiration date), and a billing address. This user information can be securely stored by the computing device(s) 112, for example, in the user account information 156 in the database 154. Further, the user account information 156 may be created for each user 102, which may include information about the user and transactions conducted by the user.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from users will be deposited. This merchant information 158 can be securely stored by the service, for example, in the database 154 along with the user account information 156. Further, a merchant profile may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment module 150 may be configured to send and receive data to and from the user device 104 and the merchant device 108. For example, the payment module 150 can be configured to send information describing merchants to an application on the user device 104 using, for example, the information stored in the database 154. For example, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108.

The computing device(s) 112 can also be configured to communicate with one or more card payment network computing devices(s) 162 of a card payment network (e.g., MasterCard®, VISA®) over the one or more networks 110 to conduct financial transactions electronically. The computing device(s) 112 can also communicate with one or more bank computing devices 164 of one or more banks over the one or more networks 110. For example, the computing device(s) 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 162 of a card payment network and the bank computing devices 164 when processing transactions for payment instruments that do not involve the payment service of the computing device(s) 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing device(s) 112 indicating that the user 102 has checked in with the merchant 106. In response, the computing device(s) 112 can communicate data to notify the merchant device 108 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing device(s) 112. In response, the computing device(s) 112 can obtain, for example, from the user account information 156, data describing a financial account associated with the electronic purchase account of the user 102 to which the total amount will be charged.

The computing device(s) 112 can then communicate with the card payment network computing devices(s) 162 of a card payment network to complete an electronic payment transaction for the total amount to be charged to user's electronic payment account. Once the electronic payment transaction is complete, the computing device(s) 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

In some examples, a merchant 106 can utilize a first merchant device 108 (e.g., a POS device) to conduct transactions with user(s) 102. For instance, the merchant 106 can input data into the first merchant device 108 associated with the transactions. The input can include times that user(s) 102 were seated at a location of the merchant 106, orders made by the user(s) 102 during the transactions with the merchant 106, or the like. Based on the input, the first merchant device 108 can utilize the POS module 138 to generate open tickets for the transactions between the merchant 106 and the user(s) 102.

In some examples, an open ticket is a data structure that stores information associated with interactions between the merchant 106 and user(s) 102 during a course of a transaction. The interactions can include an identity of the merchant 106, a location of the merchant 106, identities of the user(s) 102, items order by the user(s) 102 during the transaction (e.g., cart information), timestamps for each of the items ordered by the customers during the transaction, a cost associated with each of the items, a cost associated with the open ticket, or other information associated with the transaction. After creating the open tickets, and during the course of the transactions, the first merchant device 108 can further utilize the POS module 138 to update the data structures for the open tickets. For instance, the first merchant device 108 can utilize the POS module 138 to add (e.g., store) additional information associated with interactions between the merchant 106 and the user(s) 102 to the data structures.

In some examples, the open ticket data structures further include versioning data structures that the first merchant device 108 uses to when synchronizing with a second merchant device 108 associated with the merchant 106 (e.g., a kitchen display system). Each versioning data structure for a respective open ticket data structure can include a vector that indicates each time the respective open ticket data structure is updated by the first merchant device 108 (and/or any other of the merchant device(s) 108). For instance, when an open ticket data structure is first created, the first merchant device 108 may cause the vector of the versioning data structure to include a count of one. The first merchant device 108 can then increase the count of the vector each time the first merchant device 108 updates the open ticket.

Open ticket data structures described herein may be generated and maintained using some or all of the techniques described in U.S. patent application Ser. No. 14/686,381, filed on Apr. 14, 2015 and entitled "Open Ticket Payment Handling with Offline Mode", and U.S. patent application Ser. No. 14/871,776, filed Sep. 30, 2015, entitled "Anticipatory Creation of Point-Of-Sale Structures," which are incorporated herein by reference in its entirety.

In some examples, while processing transactions for the merchant 106, the first merchant device 108 synchronizes with the second merchant device 108. For instance, the first merchant device 108 can send data associated with the open tickets to the second merchant device 108 each time the first merchant device 108 receives input and/or at given time intervals. The second merchant device 108 can receive the data from the first merchant device 108 and based on receiving the data, generate order tickets for the transactions. In some examples, the order tickets for the transactions are data structures that include data indicating items ordered by user(s) 102 during the transactions that are in an "in-progress" state of being prepared by the merchant 106. The second merchant device 108 can then display the order tickets via a kitchen display user interface.

In some examples, in order to synchronize the merchant devices 108, the second merchant device 108 can utilize the versioning data structures included in the open ticket data structures to determine when the open ticket data structures were updated. For instance, a first time that the first merchant device 108 synchronizes an open ticket with the second merchant device 108, the second merchant device 108 can determine that the open ticket is new based on the versioning data structure of the open ticket including a count of zero. After the synchronization, the first merchant device 108 may update the open ticket with additional items based on a customer order. In response, the first merchant device 108 may update the count of the versioning data structure to two based on the update to the open ticket. As such, when the first merchant device 108 again synchronizes with the second merchant device 108, the second merchant device can determine that the open ticket is updated based on the versioning data structure for the open ticket including a count of two.

In some examples, the second merchant device 108 synchronizes with the first merchant device 108. For instance, the second merchant device 108 can send data associated with order tickets to the first merchant device 108 each time the second merchant device 108 receives input and/or at given time intervals. For instance, the second merchant device 108 can receive input indicating that one or more items from an order ticket are complete. In response, the second merchant device 108 can update the order ticket to indicate that the one or more items are complete. The second merchant device 108 can further send data associated with the updated order ticket to the first merchant device 108.

While conducting transactions with user(s) 102, a location of the merchant 106 may become filled to capacity. For instance, in some examples, each of the tables at the location of the merchant 106 may be occupied by one or more user(s) 102. In some examples, a portion of the tables at the location of the merchant 106 may be occupied by one or more user(s) 102 while the rest of the tables may be reserved by additional user(s) 102. In either case, based on the location of the merchant 106 being filled to capacity, the first merchant device 108 can generate a waitlist for the merchant 106. In some examples, the waitlist includes a data structure that stores information associated with wait times for one or more locations within the merchant's location.

In some examples, the first merchant device 108 generates the waitlist using both front of the house data (e.g., data associated the first merchant device 108) and back of the house data (e.g., data associated with the second merchant device 108). For instance, the first merchant device 108 can use front of the house data to calculate initial wait times (e.g., estimated wait times) for a waitlist. The front of the house data can include data indicating when user(s) 102 were seated at one or more tables at the location of the merchant 106, reservation times for one or more of the tables at the location of the merchant 106, average turn times for each of the tables at the location of the merchant 106, or the like. In some examples, the first merchant device 108 can then update the initial wait times for the waitlist using back of the house data from the second merchant device 108. The back of the house data can include data indicating orders made by user(s) 102 at one or more of the tables, a progress (e.g., estimated time remaining for preparation) of the orders made by the user(s) 102, or the like. After generating the waitlist, the first merchant device 108 can provide the waitlist via the payment service interface 136.

In some examples, in addition to or alternatively from the first merchant device 108 generating the waitlist, the computing device(s) 112 can utilize the waitlist module 152 to generate waitlist(s) 160 for the merchant 106. For instance, the computing device(s) 112 can receive front of the house data (e.g., data associated with transactions) from the first merchant device 108. In some examples, the front of the house data can include data indicating times that user(s) 102 were seated at a location of the merchant 106, orders made by the user(s) 102 during the transactions with the merchant 106, or the like. The computing device(s) 112 can then utilize the waitlist module 152 to generate a waitlist 160 based on the data.

The computing device(s) 112 can further receive back of the house data from the second merchant device 108. For instance, the computing device(s) 112 can receive data associated with order tickets from the second merchant device 108 each time the second merchant device 108 receives input and/or at given time intervals. The computing device(s) 112 can then utilize the waitlist module 152 to update the wait times for the waitlist 160 using the back of the house data. In some examples, after generating the waitlist(s) 160 for the merchant, the computing device(s) 112 can send data associated with the waitlist(s) 160 to the first merchant device 108.

Figure 2:
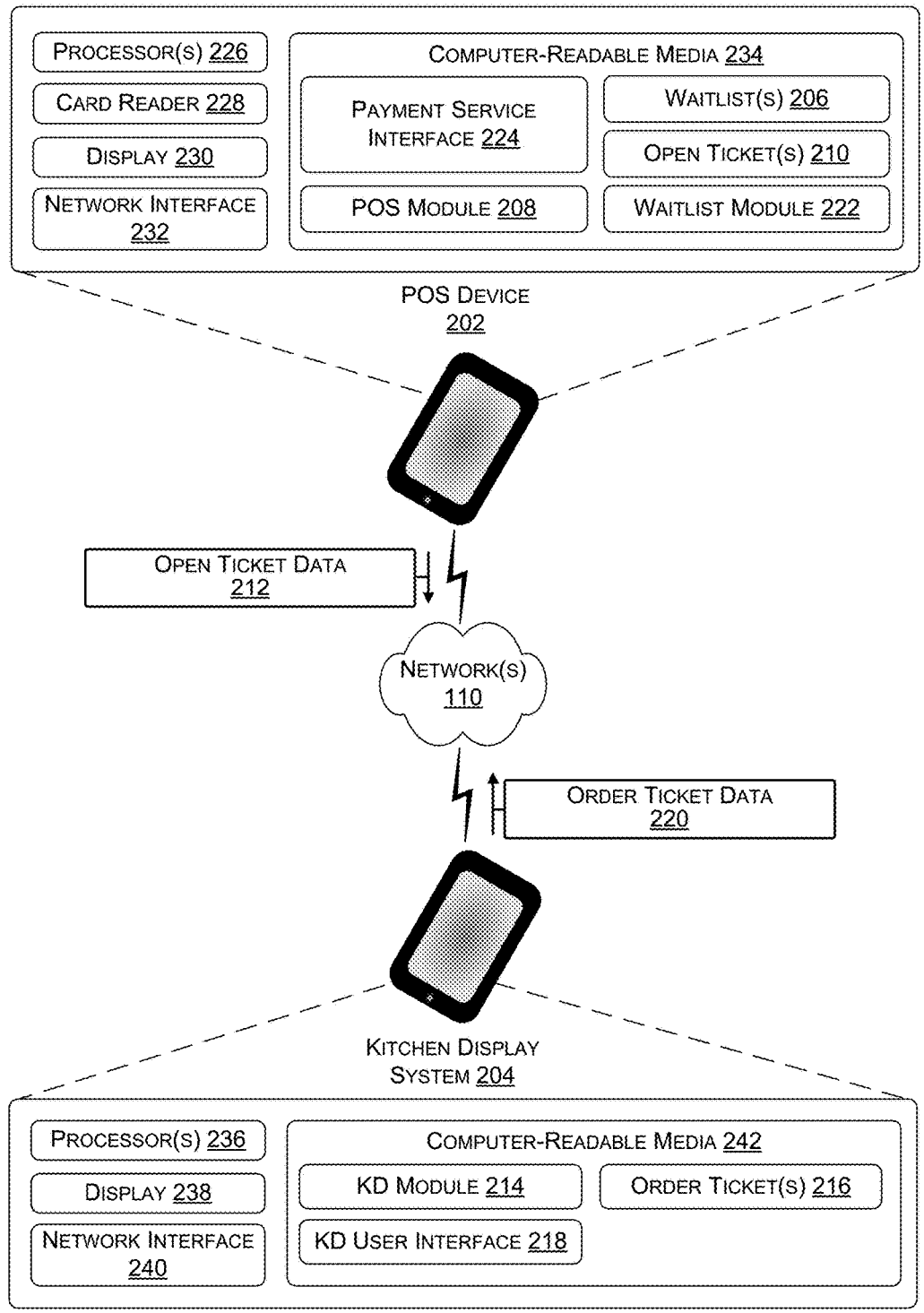
FIG. 2 is an example illustration of a POS device synchronizing with a kitchen display system in order to generate waitlists for a merchant.

FIG. 2 is an example illustration of a POS device 202 synchronizing with a kitchen display system 204 in order to generate waitlist(s) 206 for a merchant. In the example of FIG. 2, each of the POS device 202 and the kitchen display system 204 can represent one of merchant device(s) 108. For instance, in some examples, a merchant can utilize the POS device 202 to process transactions with customers (e.g., user(s) 102) at a front of the merchant's location. The merchant can further utilize the kitchen display system 204 to prepare items associated with the transactions at the back (e.g., the kitchen) of the merchant's location.

To process transactions with customers, the POS device 202 can receive input associated with the transactions. The input can include times that customers were seated at the merchant's location, orders made by the customers (e.g., items ordered by the customers) during the transactions with the merchant, or the like. Based on the input, the POS device 202 can utilize the POS module 208, which can represent POS module 138, to generate open tickets 210 for the transactions between the merchant and the customers. As discussed above, in some examples, an open ticket 210 is a data structure that stores information associated with interactions between the merchant and the customers during a course of a transaction. The interactions can include an identity of the merchant, the merchant's location, an identity of the customers associated with the transaction, items order by the customers during the transaction (e.g., cart information), a cost associated with each of the items, a cost associated with the open ticket 210, or other information associated with the transaction.

In the example of FIG. 2, the POS device 202 synchronizes with the kitchen display system 204. For instance, the POS device 202 can send open ticket data 212 to the kitchen display system 204. The open ticket data 212 can include data associated with the transactions between the merchant and the customers (e.g., open ticket(s) 210 data). For instance, the open ticket data 212 can include identities of the open ticket(s) 210, identities of customers associated with the open ticket(s) 210, a list of the items associated with each of the orders made by the customers, the versioning data structures of the open ticket(s) 210, or the like. In some examples, the POS device 202 sends the open ticket data 212 to the kitchen display system 204 each time the POS device 202 receives input (e.g., an order) associated with a transaction. Additionally or alternatively, in some examples, the POS device 202 sends the open ticket data 212 to the kitchen display system 204 at given time intervals. For instance, the POS device 202 can send the open ticket data 212 to the kitchen display system 204 every second, minute, five minutes, or the like.

The kitchen display system 204 can receive the open ticket data 212 from the POS device 202. Based on receiving the open ticket data 212, the kitchen display system 204 can utilize the kitchen display (KD) module 214 to generate order ticket(s) 216 for the transactions. For instance, in some examples, the kitchen display system 204 utilizes the kitchen display module 214 to generate an order ticket 216 for a respective customer order each time the kitchen display system 204 receives open ticket data 212 associated with a new respective customer order (which can be determined based on the versioning data structure described above). In some examples, each of the order ticket(s) 216 can include one or more of an identity of an open ticket 210, an identity of customers associated with the open ticket 210, indications of the items ordered by the customers that are in an "in-progress" state, a timer that indicates an amount time since the POS device 202 received the customer order, or the like. The kitchen display system 204 can then display the order ticket(s) 216 via the kitchen display (KD) interface 218.

The kitchen display interface 218 can include one or more order ticket(s) 216 that are currently in an "in-progress" state. In some examples, order ticket(s) 216 are in an "in-progress" state when the order ticket(s) 216 include at least one item that is currently being prepared, or needs to be prepared, by the merchant. In some examples, an order ticket 216 includes the "in-progress" state until the kitchen display system 204 receives input indicating that each of the items from the order ticket 216 have been complete. Based on receiving the input, the kitchen display system 204 can remove the order ticket 216 from the kitchen display interface 218.

In the example of FIG. 2, the kitchen display system 204 further synchronizes with the POS device 202. For instance, the kitchen displays system 204 can send order ticket data 220 to the POS device 202. The order ticket data 220 can include data associated with one or more order ticket(s) 216 that the kitchen display system 204 creates for the open ticket(s) 210. In some examples, the kitchen display system 204 sends the POS device 202 the order ticket data 220 each time the kitchen display system 204 receives input associated with one of the order ticket(s) 216. Additionally or alternatively, in some examples, the kitchen display system 204 sends the POS device 202 the order ticket data 220 at given time intervals. For instance, the kitchen display system 204 can send the order ticket data 220 to the POS device 202 every second, minute, five minutes, or the like.

In the example of FIG. 2, the POS device 202 utilizes the waitlist module 222 to generate waitlist(s) 206 using both front of the house data (e.g., data associated with the POS device 202) and back of the house data (e.g., data associated with the kitchen display system 204). For instance, the POS device 202 can utilize the waitlist module 222 to calculate initial wait times (e.g., estimated wait times) for tables at the merchant's location. The waitlist module 222 can calculate the initial wait times using data indicating times that customers were seated the tables of the merchant's location, reservation times for one or more tables at the merchant's location, average turn times associated with each of the tables at the merchant's location, or the like.

For instance, in some examples, the waitlist module 222 can calculate an initial wait time for one of the tables based on a time that customers were seated at the table (and/or a reservation time that customers are going to be seated at the table) and an average turn time for the table. For instance, if customers were seated at the table at 8:00 P.M., and the average turn time for the table is twenty minutes, then at 8:00 P.M., the waitlist module 222 can calculate the initial wait time for the table to include twenty minutes. The waitlist module 222 can then generate a waitlist 206 for the merchant using wait times for each of the tables.

For instance, the waitlist 206 can include the initial wait times for the tables at the merchant's location. In some examples, the waitlist module 222 orders the initial wait times included in the waitlist 206 from a shortest initial wait time to a longest initial wait time. For instance, the waitlist 206 can indicate that a first table will open in about twenty minutes, followed by a second table in twenty-five minutes, and finally followed by a third table in thirty minutes. In some examples, the waitlist module 222 can further generate the waitlist 206 based on sizes of the tables (e.g., number of people the tables sit). For instance, the waitlist 206 can include indications that the first table sits six people, the second table sits eight people, and the third table sits two people.

In the example of FIG. 2, the POS device 202 can further utilize the waitlist module 222 to update waitlist(s) 206 using order ticket data 220 received from the kitchen display system 204. For instance, in some examples, the POS device 202 can determine one or more states of the transactions based on both the open ticket(s) 210 and the order ticket(s) 216 that the kitchen displays system 204 is currently presenting. A state of a transaction can include one or more of (1) the customers were seated, (2) the customers made a drink order, (3) the drink order is "in progress" of being prepared (e.g., with estimated time remaining), (4) the drink order (and/or one or more drinks from the drink order) is ready to be delivered to the customers, (5) the customers received the drink order (and/or one or more drinks from the drink order), (6) the customers made a food order, (7) the food order is "in progress" of being prepared (e.g., with estimated time remaining), (8) the food order (and/or one or more items from the food order) is ready to be delivered to the customers, (9) the customers received the food order (and/or one or more items from the food order), (10) the customers received the ticket for the transaction, and/or (11) the POS device 202 processed the transaction. The POS device 202 can then utilize the waitlist module 222 to update the waitlist(s) 206 based on the one or more states of the transactions.

For example, the POS device 202 may utilize the waitlist module 222 to calculate that an initial wait time for a particular table is twenty minutes (e.g., the average turn time for the particular table). The average turn time for the particular table may be based on customers at the particular table making a food order five minutes after being seated at the particular table. However, after ten minutes, a state of the transaction at the table may include that customers at the particular table just made the food order. As such, since the food order was made five minutes after the average food order is made at the particular table, the POS device 202 may utilize the waitlist module 222 to update the initial wait time by adding five minutes.

For another example, the POS device 202 may utilize the waitlist module 222 to calculate that an initial wait time for a particular table is thirty minutes (e.g., the average turn time for the particular table). However, based on the fact that the merchant is very busy on the particular night, and after the customers have been seated for twenty minutes, a state of the transaction at the table may include that the customers' food order is still "in progress" of being prepared. Additionally, the state of the transaction may indicate that the food order will not be ready for another ten minutes. Based on the state of the transaction, the POS device 202 can utilize the waitlist module 222 to update the initial wait time for the particular data.

In some examples, the POS device 202 can utilize the waitlist module 222 to continue to automatically update the waitlist(s) 206 based on receiving additional order ticket data 220 from the kitchen display system 204. For example, the POS device 202 can receive input indicating that customers at a particular table made a second food order associated with a transaction. Based on the input, the POS device 202 can update an open ticket 210 for the transaction. Additionally, the POS device can send open ticket data 212 associated with the update to the kitchen display system 204. The kitchen display system 204 can receive the open ticket data 212 from the POS device 202 and generate an order ticket 216 for the second customer order.

The POS device 202 can then receive order ticket data 220 from the kitchen display system 204 for the generated order ticket 216. Based on the order ticket data 220, the POS device 202 can determine a state associated with the transaction. For instance, the POS device 202 can determine that it will take the kitchen about fifteen minutes to prepare the items in the second customer order. The POS device 202 can then utilize the waitlist module 222 to update an initial wait time for the particular table based on the state of the transaction.

For another example, the kitchen display system 204 can receive input indicating that one or more items from an order ticket 216 have been complete. Based on receiving the input, the kitchen display system 204 can update the order ticket 216 and send order ticket data 220 associated with the update to the POS device 202. The POS device 202 can receive the order ticket data 220 from the kitchen display system 204. The POS device 202 can then utilize the waitlist module 222 to update wait times for a waitlist 206 based on the order ticket data 220. For instance, if the one or more items were prepared faster than an average turn time for transactions at the merchant estimates, then the POS device 202 can utilize the waitlist module 222 to decrease one or more wait times in the waitlist 206. However, if the one or more items were prepared slower than the average turn time for transactions at the merchant estimates, then the POS device 202 can utilize the waitlist module 222 to increase one or more wait times in the waitlist 206.

In the example of FIG. 2, after generating waitlist(s) 206 for the merchant, the POS device 202 can present (e.g., display) the waitlist(s) 206 via the payment service interface 224, which can represent the payment service interface 136. In some examples, the merchant can update the waitlist(s) 206 using the payment service interface 224. For instance, the POS device 202 can receive input indicating one or more reservations made by customers. The POS device 202 can then utilize the waitlist module 222 to update the waitlist(s) 206 based on the input. Additionally, the POS device 202 can receive input indicating one or more orders made by customers that are currently waiting to be seated and/or by one or more customers making to-go order (e.g., for delivery). The POS device 202 can then utilize the waitlist module 222 to update the waitlist(s) 206 based on the input.

It should be noted that, in some examples, the POS device 202 can synchronize with multiple kitchen display systems in order to generate waitlist(s) 206. For instance, a customer order for a transaction may include a first item prepared by a first station of the kitchen and a second order prepared by a second station of the kitchen. The POS device 202 can thus receive first data from a first kitchen display system that provides a first order ticket to the first station of the kitchen, and the POS device 202 can receive second data from a second kitchen display system that provides a second order ticket to the second station of the kitchen. The POS device 202 can then utilize the waitlist module 222 to update waitlist(s) 206 based on the first data and the second data.

For instance, the POS device 202 may determine that the first station will prepare the first item in five minutes using the first data. The POS device may further determine that the second station will prepare the second item in fifteen minutes using the second data. Based on the preparation times for the items, the POS device 202 can utilize the waitlist module 222 to update the waitlist(s) 206 using the first data and/or the second data. For instance, in some examples, the POS device 202 utilizes the waitlist module 222 to update the waitlist(s) 206 using the second data since the second preparation time is longer than the first preparation time.

In the example of FIG. 2, the POS device 202 includes processor(s) 226, card reader 228, display 230, network interface 232, and computer-readable media 234, which can represent processor(s) 126, card reader 130, display 132, network interface 134, and computer-readable media 128, respectively. Additionally, kitchen display system 204 includes processor(s) 236, display 238, network interface 240, and computer-readable media 242, which can represent includes processor(s) 126, display 132, network interface 134, and computer-readable media 128, respectively.

Figure 3:
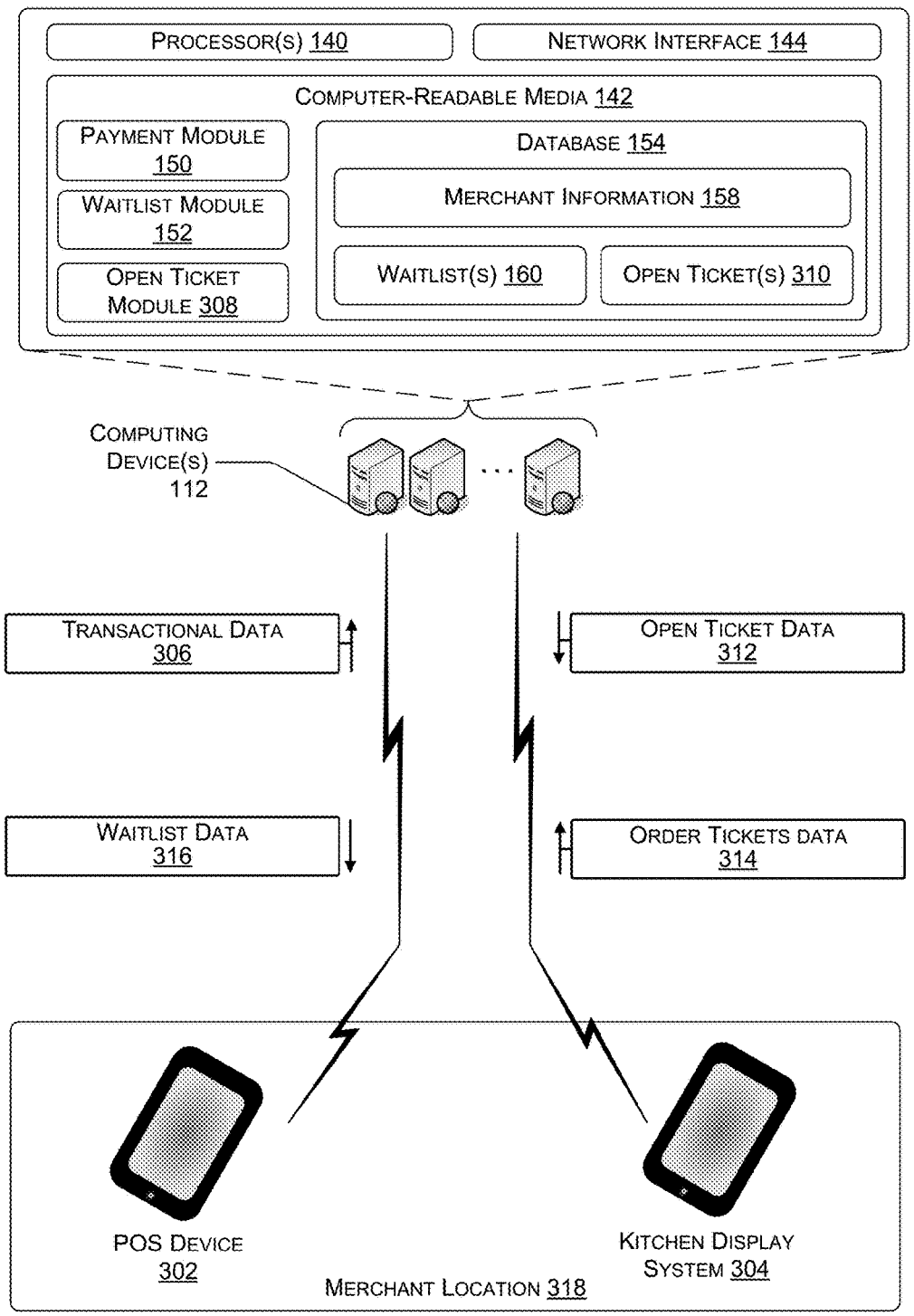
FIG. 3 is an example illustration a third-party service synchronizing a POS device with a kitchen display system in order to generate waitlists for a merchant.

FIG. 3 is an example illustration a third-party service (e.g., the computing device(s) 112) synchronizing a POS device 302 with a kitchen display system 304 in order to generate waitlist(s) 160 for a merchant. In the example of FIG. 3, the POS device 302 and the kitchen display system 304 can represent the POS device 202 and the kitchen display system 204, respectively. In some examples, the third-party service (e.g., the computing device(s) 112) processes transactions and generates waitlist(s) 160 for the merchant. However, in some examples, the third-party service may include a service that only generates waitlists for the merchant.

In the example of FIG. 3, the POS device 302 can receive input corresponding to customer orders associated with transactions between the merchant and customers. Based on receiving the input, the POS device 302 can send transactional data 306 associated with the transactions to the computing device(s) 112. The transactional data 306 can include data indicating an identity of the merchant, identities of the customers, cart information (e.g., items ordered by the customers during transactions), times associated with the transactions (e.g., times that he customers were seated), or the like. In some examples, the POS device 302 sends the computing device(s) 112 transaction data 306 for a transaction each time the POS device 302 receives input associated with the transaction. Additionally or alternatively, in some examples, the POS device 302 sends the computing device(s) 112 transaction data 306 at given time intervals, such as every second, minute, five minutes, or the like.

The computing device(s) 112 can receive the transactional data 306 from the POS device 302. In some examples, the computing device(s) 112 utilize an open ticket module 308 to generate open ticket(s) 310 for the transactions using the transactional data 306. For instance, the computing device(s) 112 can generate open ticket(s) 310 for the transactions using a similar process as the POS device 202 generating open ticket(s) 210 as described above. The computing device(s) 112 can then send the kitchen display system 304 open ticket data 312. In some examples, the open ticket data 312 can be similar to the open ticket data 212. For instance, the open ticket data 312 can include identities of the open ticket(s) 310, identities of customers associated with the open ticket(s) 310, a list of items for each of the orders made by the customers during the transactions, or the like.

The kitchen display system 304 can receive the open ticket data 312 form the computing device(s) 112. Based on receiving the open ticket data 312, the kitchen display system 3104 can generate order tickets (e.g., order ticket(s) 216) for the transactions. The kitchen display system 304 can then send the computing device(s) 112 order ticket data 314, which can represent the order ticket data 220. In some examples, the kitchen display system 304 sends the order ticket data 314 to the computing device(s) 112 each time the kitchen display system 304 receives input associated with one of the order tickets. Additionally or alternatively, in some examples, the kitchen display system 304 sends the order ticket data 314 to the computing device(s) 112 at given time intervals, such as every second, minute, five minutes, or the like.

The computing device(s) 112 can receive the order ticket data 314 from the kitchen display system 304. In some examples, the computing device(s) 112 then utilize the waitlist module 152 to generate waitlist(s) 160 for the merchant using a similar process as the POS device 202 utilizing the waitlist module 222 to generate the waitlist(s) 206. For instance, the computing device(s) 112 can utilize the waitlist module 152 to calculate initial wait times for waitlist(s) 160 using front of the house data that is received from the POS device 302. The computing device(s) 112 can then utilize the waitlist module 152 to update the initial wait times using the back of the house data that is received from the kitchen display system 304.

After generating waitlist(s) 160, the computing device(s) 112 can send waitlist data 316 associated with the waitlist(s) 160 to the POS device 302. In some examples, the computing device(s) 112 send the POS device 302 the waitlist data 316 each time the computing device(s) 112 update the waitlist(s) 160 (e.g., based on the order tickets data 314). In some examples, the computing device(s) 112 send the POS device 302 the waitlist data 316 at given time intervals. For instance, the computing device(s) 112 can send the POS device 302 the waitlist data 316 every second, minute, five minutes, or the like. The POS device 302 can receive the waitlist data 316 from the computing device(s) 112 and then use the waitlist data 316 to present (e.g., display) the waitlist(s) 160.

It should be noted that, in the example of FIG. 3, the POS device 302 and the kitchen display system 304 are located at a merchant location 318 of the merchant. In such an example, the merchant location 318 can include a brick-and-mortar (e.g., physical) store associated with the merchant. However, in some examples, the POS device 302 and/or the kitchen display system 304 may not be located at the same merchant location. For instance, the POS device 302 can be located at a first location associated with the merchant while the kitchen display system 304 is located at a second location associated with the merchant.

Figure 4:
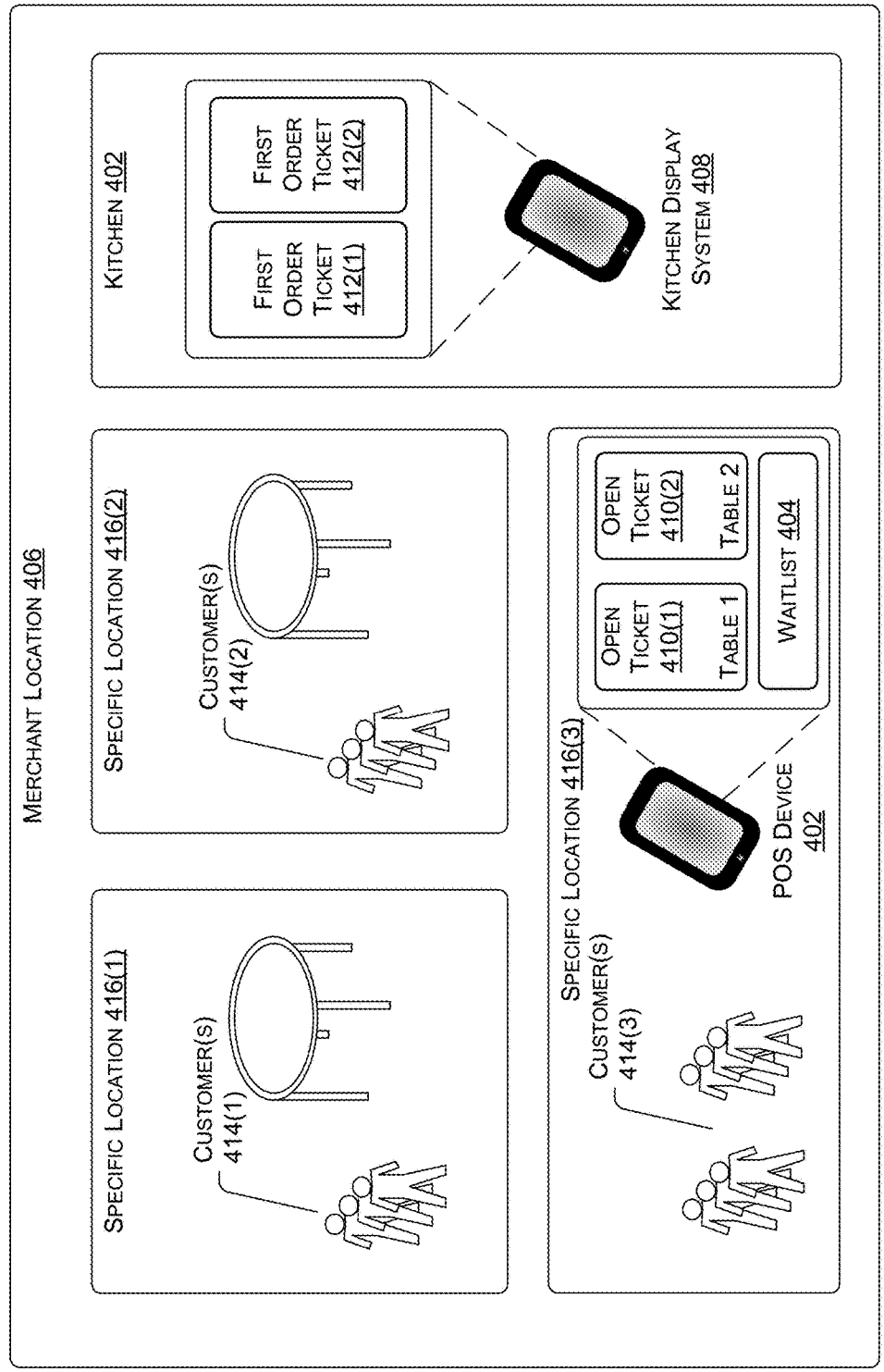
FIG. 4 is an example illustration of a POS device providing a waitlist at a merchant's location.

FIG. 4 is an example illustration of a POS device 402 providing a waitlist 404 at a merchant's location 406. In the example of FIG. 4, the POS device 402, the waitlist 404, the kitchen display system 408, the open tickets 410(1)-(2), the order tickets 412(1)-(2), and the customer(s) 414(1)-(3) can represent the POS device 202, a waitlist 206, the kitchen display system 204, the open ticket(s) 210, the order ticket(s) 216, and the user(s) 102, respectively.

In the example of FIG. 4, the merchant location 406 provides seating for customer(s) 414(1)-(3) at a first specific location 416(1) and a second specific location 416(2). For instance, first customer(s) 414(1) are seated at the table at the first specific location 416(1) and second customers(s) 414(2) are seated at the table at the second specific location 416(2). Additionally, the merchant location 406 provides a waiting area for customer(s) 414(1)-(3) at a third specific location 416(3). For instance, the third customer(s) 414(3) are waiting in the third specific location 416(3) to be seated by the merchant.

Additionally, in the example of FIG. 4, the POS device 402 is presenting a first open ticket 410(1) and a second open ticket 410(2). The POS device 402 can generate the first open ticket 410(1) for the first customer(s) 414(1) at the first specific location 416(1) and the second open ticket 410(2) for the second customer(s) 414(2) at the second specific location 416(2). For instance, the POS device 402 can receive input corresponding to orders made by the first customer(s) 414(1) during a transaction between the first customer(s) 414(1) and the merchant. The POS device 402 can then generate the first open ticket 410(1) based on the input. Additionally, the POS device 402 can receive input corresponding to orders made by the second customer(s) 414(2) during a transaction between the second customer(s) 414(2) and the merchant. The POS device 402 can then generate the second open ticket 410(2) based on the input.

Also in the example of FIG. 4, the kitchen display system 408, which is located in the kitchen 418 of the merchant location 406, presents a first order ticket 412(1) and a second order ticket 412(2). In some examples, the kitchen display system 408 can receive data associated with the transaction between the merchant and the first customer(s) 414(1) (e.g., data associated with the open ticket 410(1)). The kitchen display system 408 can then generate the first order ticket 412(1) for the transaction using the data. Additionally, the kitchen display system 408 can receive data associated with the transaction between the merchant and the second customer(s) 414(2). The kitchen display system 408 can then generate the second order ticket 412(2) for the transaction using the data.

In the example of FIG. 4, the POS device 402 can generate the waitlist 404 for the merchant using front of the house data (e.g., data associated with the POS device 402) and back of the house data (e.g., data associated with the kitchen display system 408). For instance, the POS device 402 can calculate initial wait times for the first specific location 416(1) and the second specific location 416(2) using the front of the house data. In some examples, the front of the house data can include a time that the first customer(s) 414(1) were seated at the first specific location 416(1), an average turn time for the first specific location 416(1), a time that the second customer(s) 414(2) were seated at the second specific location 416(2), and an average turn time for the second specific location 416(2).

The POS device 402 can then update the initial wait times using back of the house data. The back of the house data can include data associated with the order tickets 412(1)-(2). For instance, the POS device 402 can determine a state of the transaction with the first customer(s) 414(1) and a state of the transaction with the second customer(s) 414(2) using the data associated with the order tickets 412(1)-(2). The POS device 402 can then update the initial wait times for the waitlist 404 using the states of the transactions.

FIGS. 5A-5F are example illustrations of the POS device 402 synchronizing with the kitchen display system 408 in order to generate and update the waitlist 404 for the merchant. For instance, in the example illustration of FIG. 5A, at time "1:00 P.M.", the POS device 402 generates the first open ticket 410(1) for the first transaction at the first specific location 416(1). Additionally, the POS device 402 generates the second open ticket 410(2) for the second transaction at the second specific location 416(2). The POS device 402 then presents the first open ticket 410(1) and the second open ticket 410(2) via the POS user interface 502, which can represent the payment service interface 224.

The POS device 402 further generates the waitlist 404 by calculating a first initial wait time for the first specific location 416(1) and a second initial wait time for the second specific location 416(2). In some examples, the POS device 402 calculates the first initial wait time based on an average turn time for the first specific location 416(1). Additionally, the POS device 402 calculates the second initial wait time based on the average turn time for the second specific location 416(2). For instance, in the example of FIG. 5A, the first initial wait time includes "15:00" minutes and the second initial wait time includes "15:00" minutes.

Figure 5A:
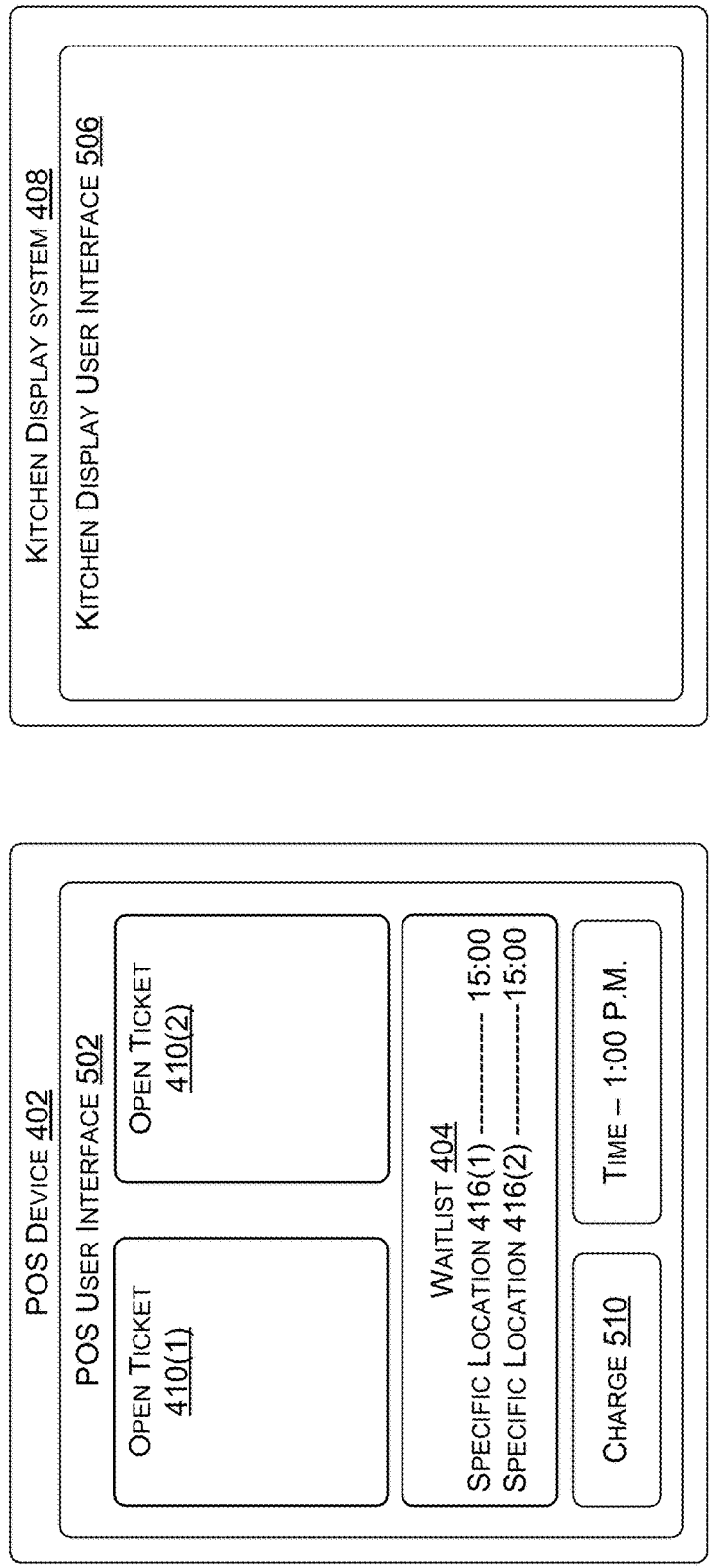
FIGS. 5A-5F are example illustrations of a POS device synchronizing with a kitchen display system in order to generate and update a waitlist for a merchant.
Figure 5B:
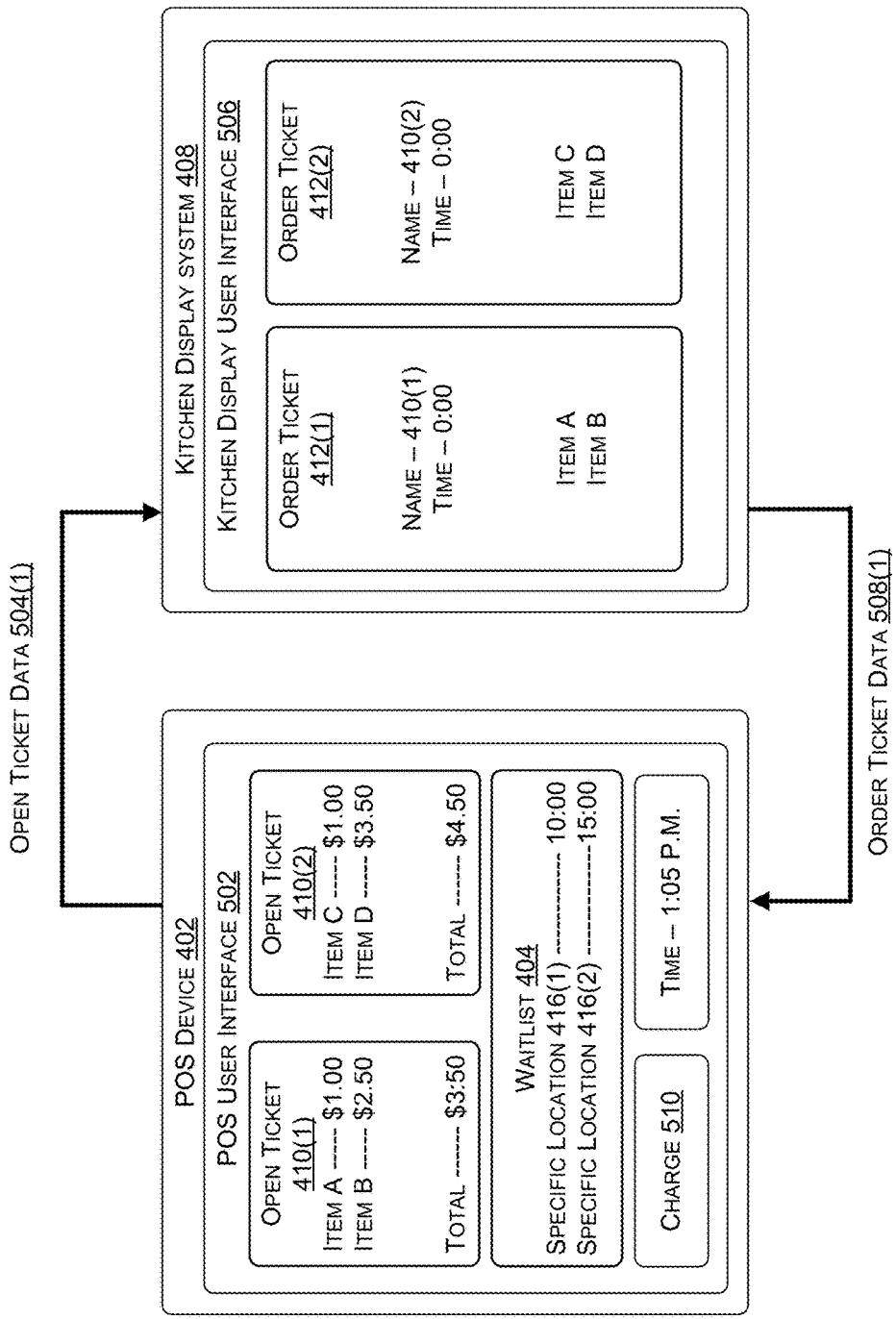

In the example illustration of FIG. 5B, five minutes later at time "1:05 P.M.", the POS device receives input corresponding to a first customer order for the first transaction and a first customer order for the second transaction. The POS device 402 then updates the first open ticket 410(1) and the second open ticket 410(2) based on the input. For instance, the POS device 402 updates the first open ticket 410(1) to indicate that the first customer(s) 414(1) at the first specific location 416(1) ordered items "A" and "B". Additionally, the POS device 402 updates the second open ticket 410(2) to indicate that the second customer(s) 414(2) at the second specific location 416(2) ordered items "C" and "D".

The POS device 402 then sends the kitchen display system 408 open ticket data 504(1), which can represent open ticket data 212. Based on receiving the open ticket data 504(1), the kitchen display system 408 generates the first order ticket 412(1) for the first customer order of the first transaction and generates the second order ticket 412(2) for the first customer order of the second transaction. The first order ticket 410(1) indicates that items "A" and "B" from the first transaction have been "in-progress" of being prepared for "0:00" minutes. Additionally, the second order ticket 410(2) indicates that the items "C" and "D" from the second transaction have been "in-progress" of being prepared for "0:00" minutes. The kitchen display system 408 then displays the order tickets 412(1)-(2) via the kitchen display user interface 506, which can represent the kitchen display user interface 218.

After generating the order tickets 412(1)-(2), the kitchen display system 408 sends the POS device 402 order ticket data 508(1), which can represent order ticket data 220. The POS device 202 receives the order ticket data 508(1) from the kitchen display system 408, and then uses the order ticket data 508(1) to update the waitlist 404. For instance, the order ticket data 508(1) may indicate that items "A" and "B" from the first order ticket 412(1) will be prepared in five minutes. As such, the POS device 402 can determine that the first initial wait time for the first specific location 416(1) is accurate and update the first wait time to "10:00" minutes. However, the order ticket data 508(2) may indicate that items "C" and "D" from the second order ticket 412(2) will be prepared in ten minutes. As such, the POS device 402 can determine that the second initial wait time for the second specific location 416(2) is wrong and update the second wait time to "15:00" minutes based on the longer preparation time.

Figure 5C:
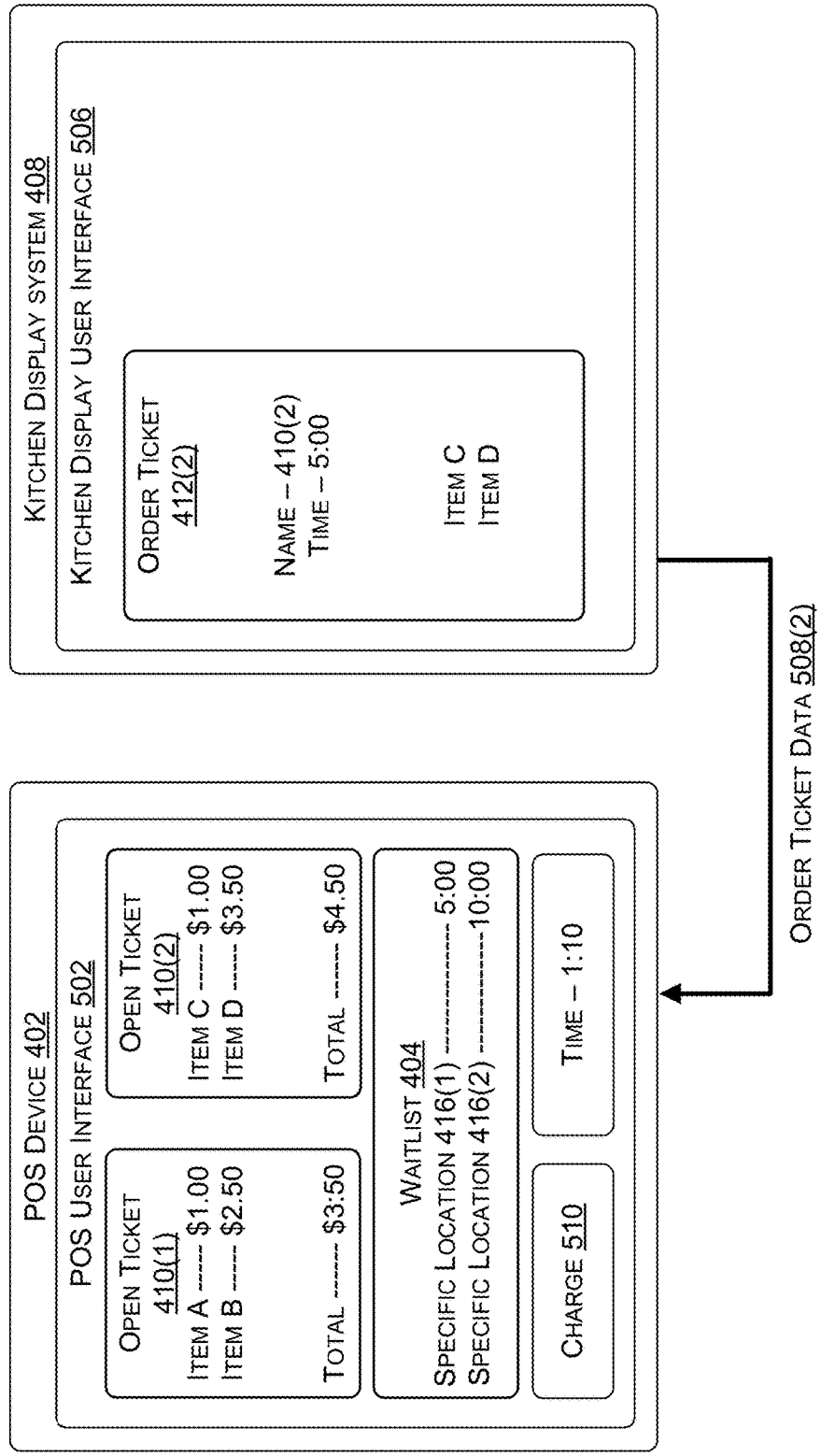

In the example illustration of FIG. 5C, five minutes later at time "1:10 P.M.", the kitchen display system 408 receives input indicating that the first order ticket 412(1) for the first transaction is complete. As such, the kitchen display system 408 removes the first order ticket 412(1) from the kitchen display user interface 506. Additionally, the kitchen display system 408 updates the second order ticket 412(2) to indicate that the second order ticket 412(2) has been "in-progress" for "5:00" minutes. After updating the order tickets 412(1)-(2), the kitchen display system 408 sends the POS device 402 order ticket data 508(2) associated with the updates, which can also represent order ticket data 220.

The POS device 402 receives the order ticket data 508(2) from the kitchen display system 408. Based on receiving the order ticket data 508(2), the POS device 402 uses the order ticket data 508(2) to update the waitlist 404. For instance, the POS device 402 can determine that items "A" and "B" from the first order ticket 412(1) were completed on time. As such, the POS device 402 can update the first wait time for the first specific location 416(1) to "5:00" minutes. Additionally, the POS device 402 can determine that the items "C" and "D" from the second order ticket 412(2) are still "in-progress" of being completed on time. As such, the POS device 402 can update the second initial wait time for the second specific location 416(2) to "10:00" minutes.

Figure 5D:
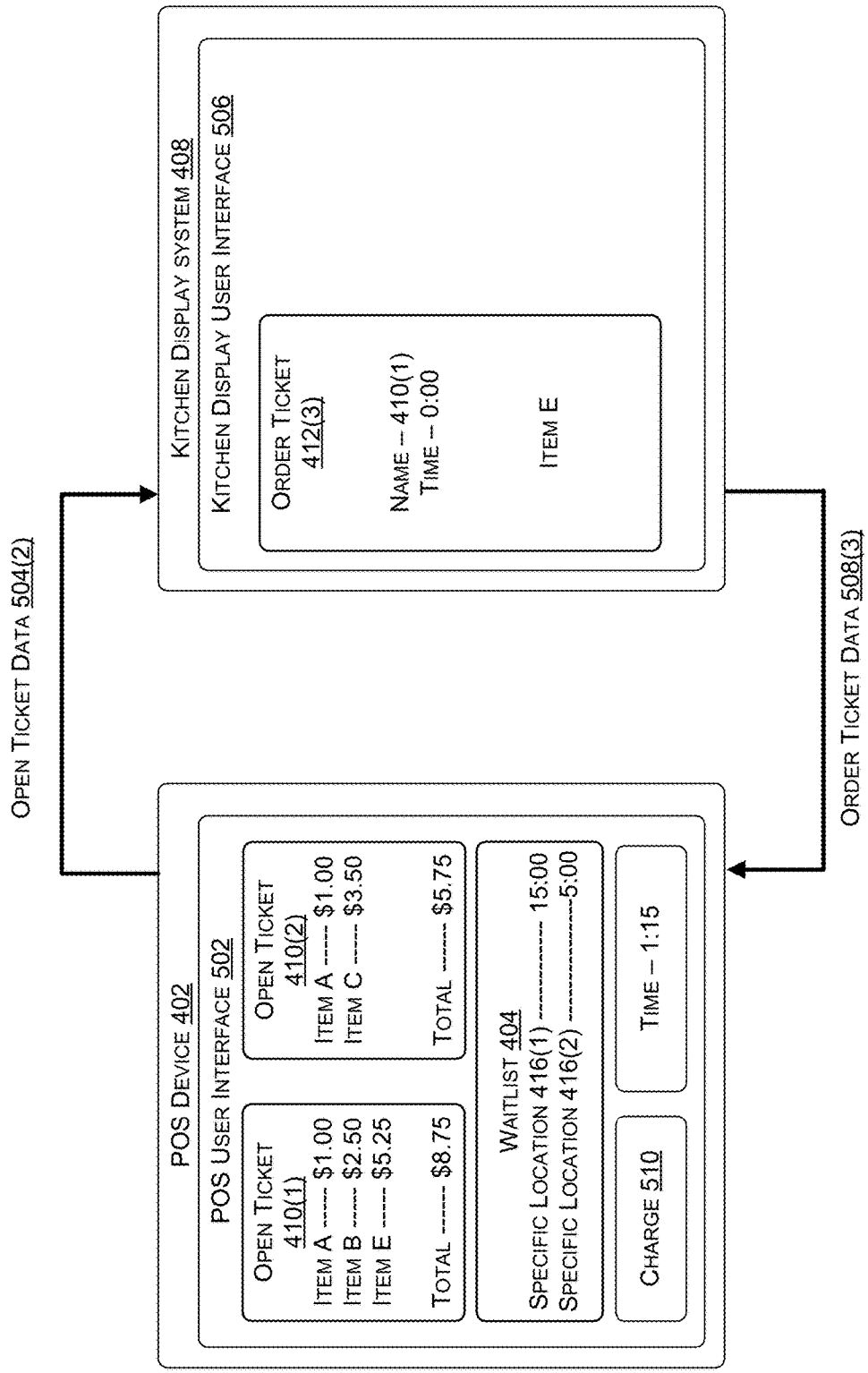

In the example illustration of FIG. 5D, five minutes later at time "1:15 P.M.", the POS device receives input corresponding to a second customer order for the first transaction. The POS device 402 then updates the first open ticket 410(1) based on the input. For instance, the POS device 402 can update the first open ticket 410(1) to indicate that the first customer(s) 414(1) at the first specific location 416(1) ordered item "E". The POS device 402 then sends the kitchen display system 408 open ticket data 504(2) associated with the ordered item "E", which can also represent open ticket data 212.

Based on receiving open ticket data 504(2), the kitchen display system 408 generates an additional order ticket 412(3) for the first transaction based on the second customer order. The additional order ticket 410(3) indicates that item "E" from the first open ticket 410(1) has been "in-progress" of being prepared for "0:00" minutes. The kitchen display system 408 then displays the additional order ticket 412(3) via the kitchen display user interface 506.

Additionally, the kitchen display system 408 receives input indicating that the second order ticket 412(2) for the second transaction is complete. As such, the kitchen display system 408 removes the second order ticket 412(2) from the kitchen display user interface 506. After updating the order tickets 412(2)-(3), the kitchen display system 408 sends the POS device 402 order ticket data 508(3) associated with the updates, which can also represent order ticket data 220.

The POS device 402 receives the order ticket data 508(3) from the kitchen display system 408. Based on receiving the order ticket data 508(3), the POS device 402 uses the order ticket data 508(3) to update the waitlist 404. For instance, the POS device determines that items "C" and "D" from the second order ticket 412(2) were completed on time. As such, the POS device updates the second wait time for the second specific location 416(2) to "5:00" minutes. Additionally, the POS device 402 determines that item "E" from the additional order ticket 412(3) will be prepared in ten minutes. As such, the POS device updates the first wait time for the first specific location 416(1) to "15:00" minutes (the POS device 402 estimates five minutes for eating item "E" included in the second customer order).

In the example of 5E, ten minutes later at time "1:25 P.M.", the kitchen display system 408 receives input indicating that the additional order ticket 412(3) for the first transaction is complete. Based on the input, the kitchen display system 408 removes the additional order ticket 412(3) from the kitchen display interface 506. Additionally, the kitchen display system 408 sends the POS device 402 order ticket data 508(4) associated with the update to the additional order ticket 412(3), which can also represent order ticket update 220.

The POs device 402 receives the order ticket data 508(4) from the kitchen display system 408. Based on receiving the order ticket data 508(4), the POS device 402 uses the order ticket data 508(4) to update the waitlist 404. For instance, the POS device 402 determines that item "E" from the additional order ticket 412(3) was completed on time. As such, the POS device 402 updates the first wait time for the first specific location 416(1) to "5:00" minutes.

Figure 5E:
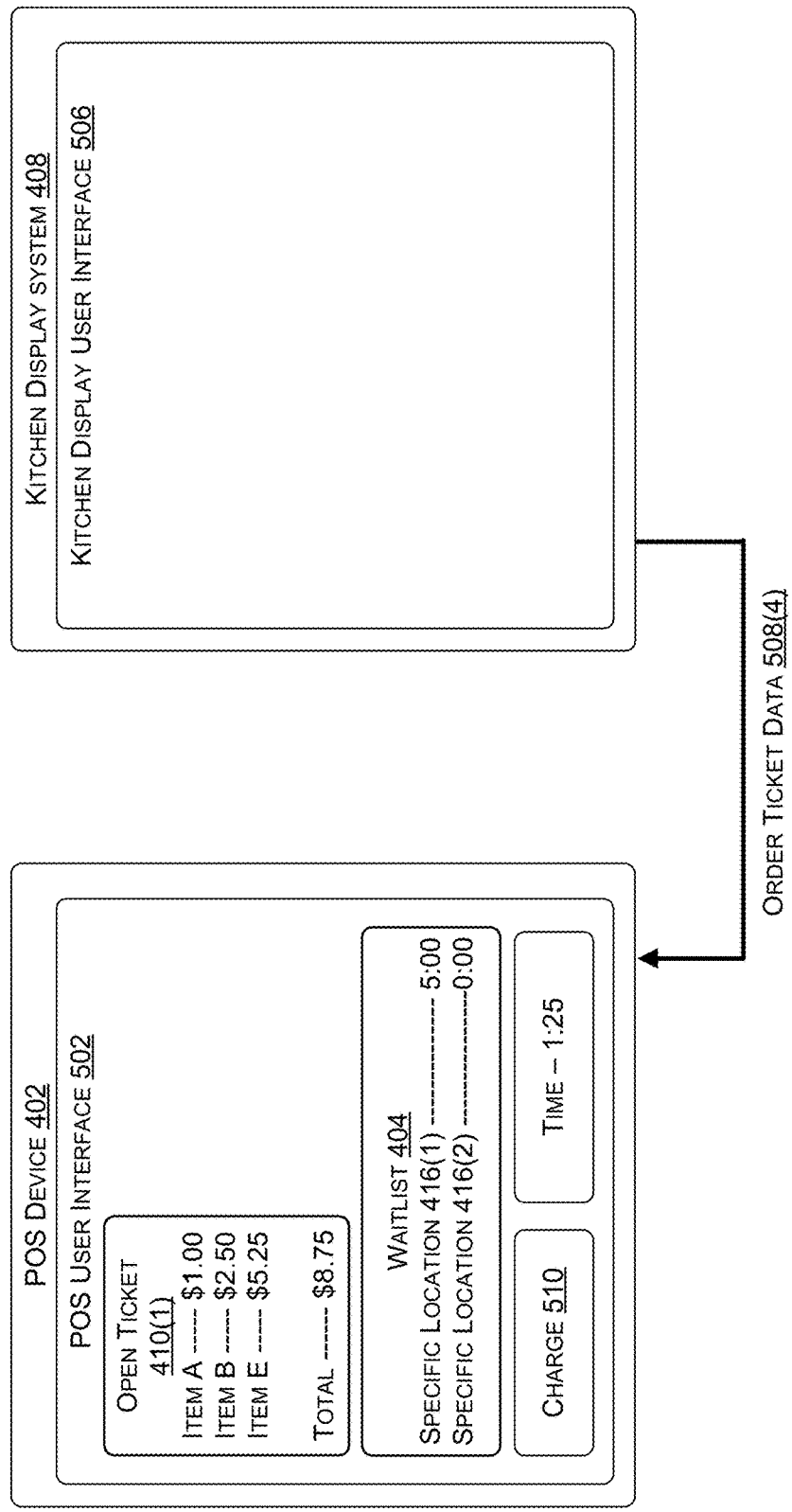
Figure 5F:
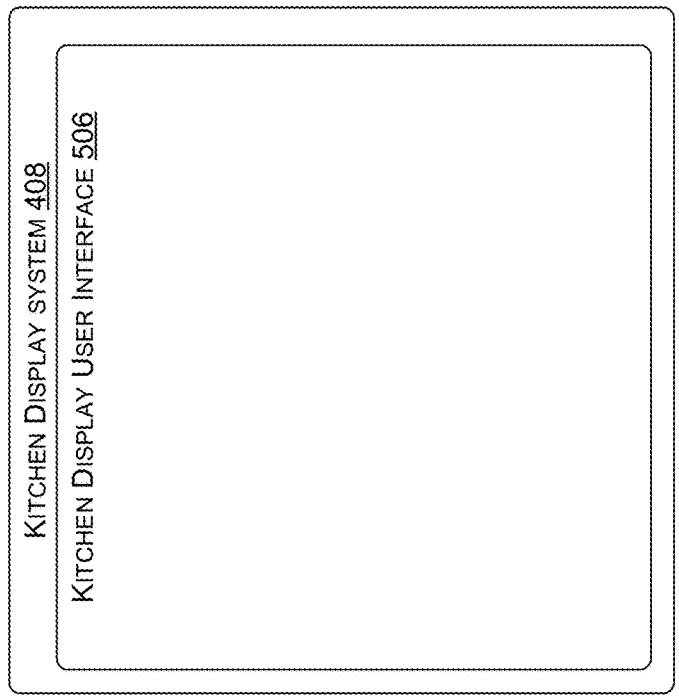
Figure 5F:
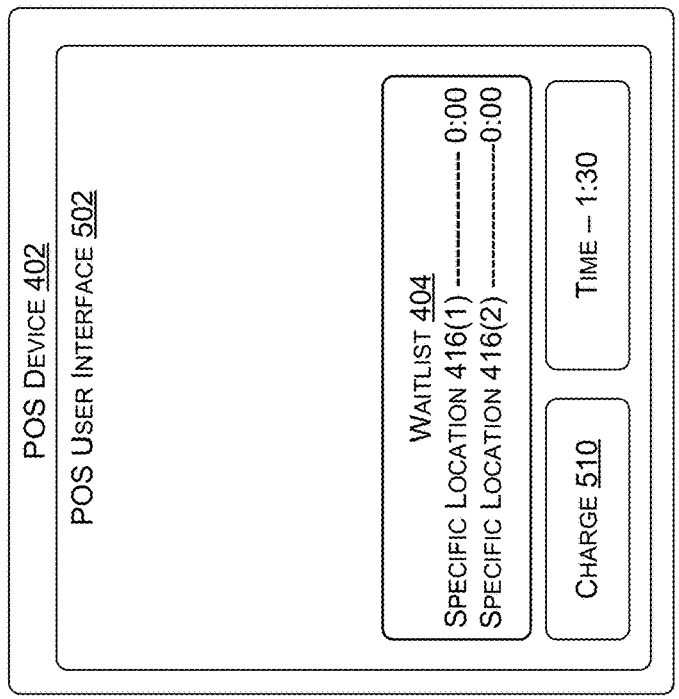

Additionally, in the example of FIG. 5E, the POS device 402 receives input (e.g., the merchant using the charge 510 button) for processing the second transaction associated with the second open ticket 410(2). For instance, the second customer(s) 414(2) may have provided the merchant with a payment instrument. The merchant can then input payment information associated with the payment instrument into the POS device 402. The POS device 402 can use the payment information to attempt to authorize the payment instrument for the cost of the second open ticket 410(2). In some examples, the POS device 402 attempts to authorize the payment instrument using a payment service (e.g., the computing device(s) 112). After processing the second transaction, the POS device 402 removes the second open ticket 410(2) from the POS user interface 502. Additionally, the POS device 402 updates the waitlist 404 to indicate that the second wait time is now "0:00" minutes (and/or removes the second wait time from the waitlist 404).

In the example of 5F, five minutes later at time "1:30 P.M.", the POS device 402 receives input (e.g., the merchant using the charge 510 button) for processing the first transaction associated with the first open ticket 410(1). For instance, the first customer(s) 414(1) may have provided the merchant with a payment instrument. The merchant can then input payment information associated with the payment instrument into the POS device 402. The POS device 402 can use the payment information to attempt to authorize the payment instrument for the cost of the first open ticket 410(1). In some examples, the POS device 402 attempts to authorize the payment instrument using a payment service (e.g., the computing device(s) 112). After processing the first transaction, the POS device 402 removes the first open ticket 410(1) from the POS user interface 502. Additionally, the POS device 402 updates the waitlist 404 to indicate that the first wait time is now "0:00" minutes (and/or removes the first wait time from the waitlist 404)

Figure 6:
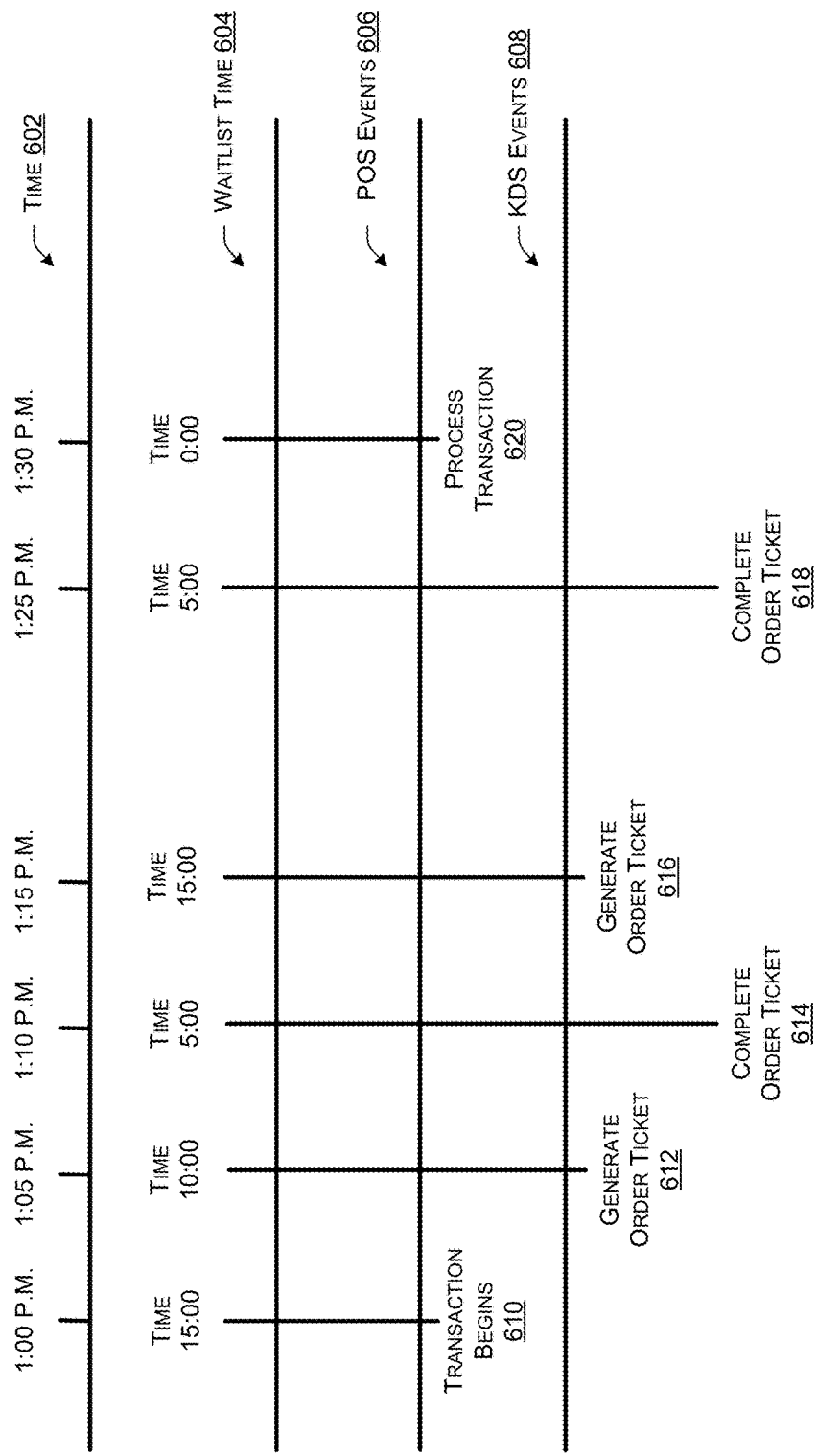
FIG. 6 is an example illustration of updating a waitlist during a transaction using data from a kitchen display system.

FIG. 6 is an example illustration of updating the waitlist 404 during the first transaction using the order ticket data 508(1)-(4) from the kitchen display system 408. The example of FIG. 6 may correspond to the events of the first transaction from FIGS. 5A-5F. As such, the example of FIG. 6 includes a time 602 that progresses through the first transaction, a waitlist time 604 associated with the first specific location 416(1), POS events 606 for the first transaction, and KDS events 608 for the first transaction.

For instance, at time "1:00 P.M.", the first transaction begins 610 when the first customer(s) 414(1) are seated at the first specific location 416(1). When the first transaction begins 602, the POS device 402 can calculate an initial waitlist time associated with the first specific location 416(1) of "15:00" minutes.

At time "1:05 P.M.", the kitchen display system 408 generates 612 the first order ticket 412(1) for the first customer order of the first transaction. The first customer order includes a preparation time of about five minutes, which is similar to an average turn over time for the first specific location 416(1). As such, the POS device 402 updates the waitlist time associated with the first specific location 416(1) to "10:00" minutes.

At time "1:10 P.M.", the kitchen display system 408 receives input indicating that the first order ticket 412(1) for the first customer order is complete 614. Since the first customer order is complete on time, the POS device 402 updates the waitlist time associated with the first specific location 416(1) to "5:00" minutes.

At time "1:15 P.M.", the kitchen display system 408 generates 616 an additional order ticket 412(3) for the second customer order of the first transaction. The second customer order includes a preparation time of about ten minutes. As such, the POS device 402 updates the waitlist time associated with the first specific location 416(1) to "15:00" minutes (the POS device 402 estimates five minutes for eating items included in the second customer order).

At time "1:25 P.M.", the kitchen display system 408 receives input indicating that the first order ticket 412(1) for the second customer order is complete 618. Since the second customer order is complete on time, the POS device 402 updates the waitlist time associated with the first specific location 416(1) to "5:00" minutes.

Finally, at time "1:30 P.M.", the POS device processes 620 the first transaction for the first customers 414(1). As such, the POS device 402 updates the waitlist time associated with the first specific location 416(1) to "0:00" minutes, indicating that the first specific location 416(1) is open.

Figure 7A:
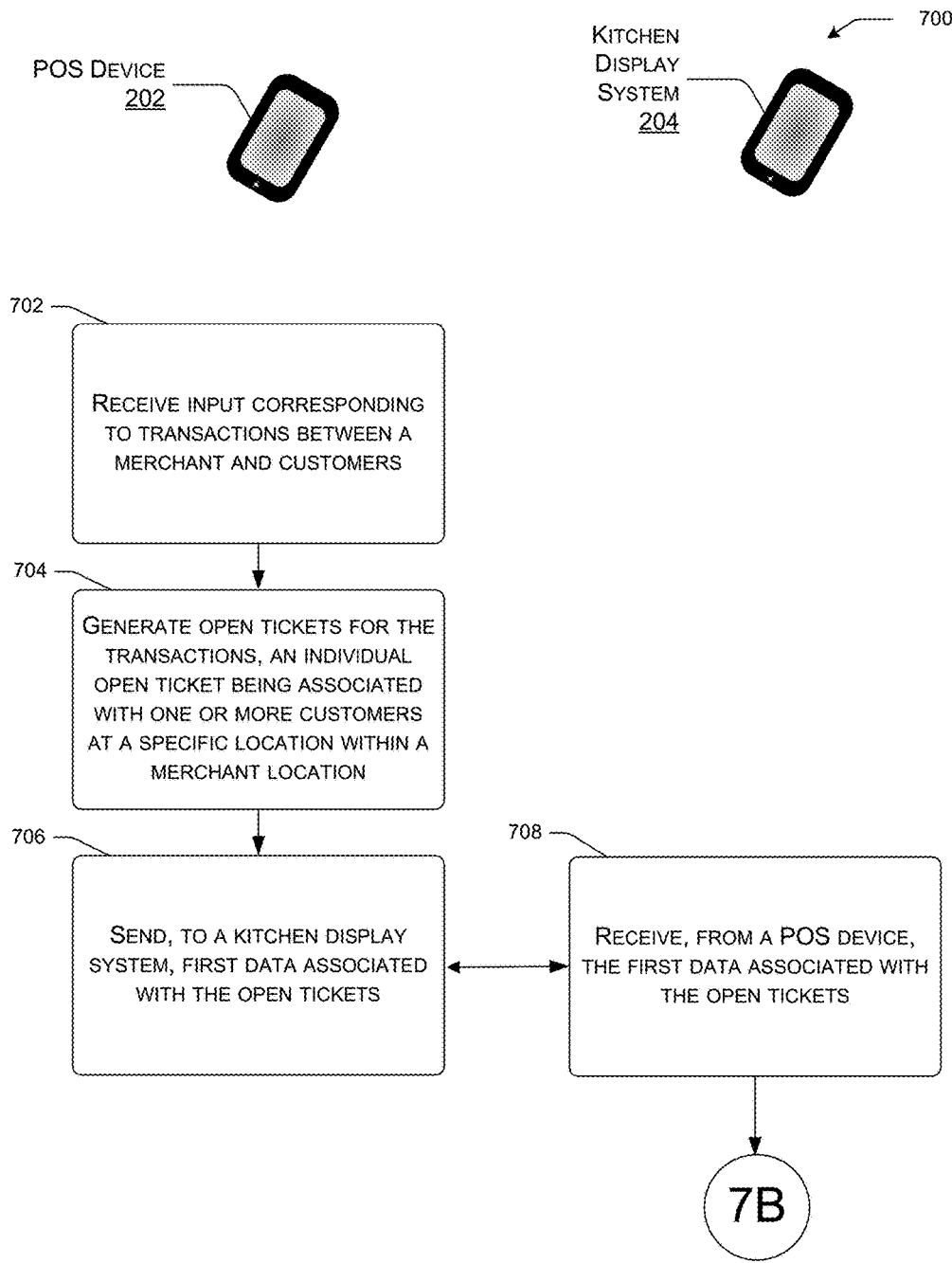
FIGS. 7A-7C are a flow diagram illustrating an example process for synchronizing kitchen display system functionality with point-of-sale (POS) waitlist generation.
Figure 7B:
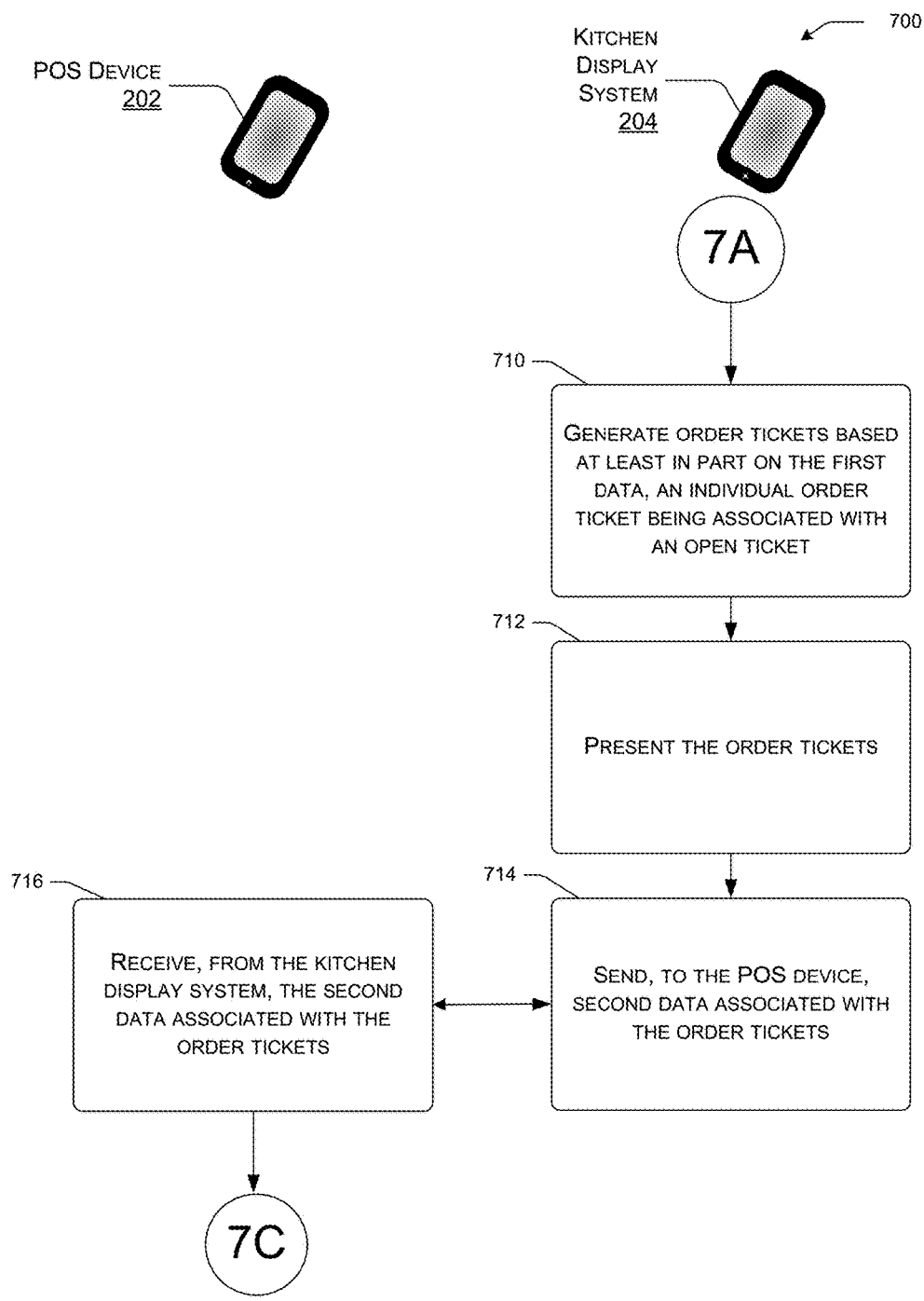
Figure 7C:
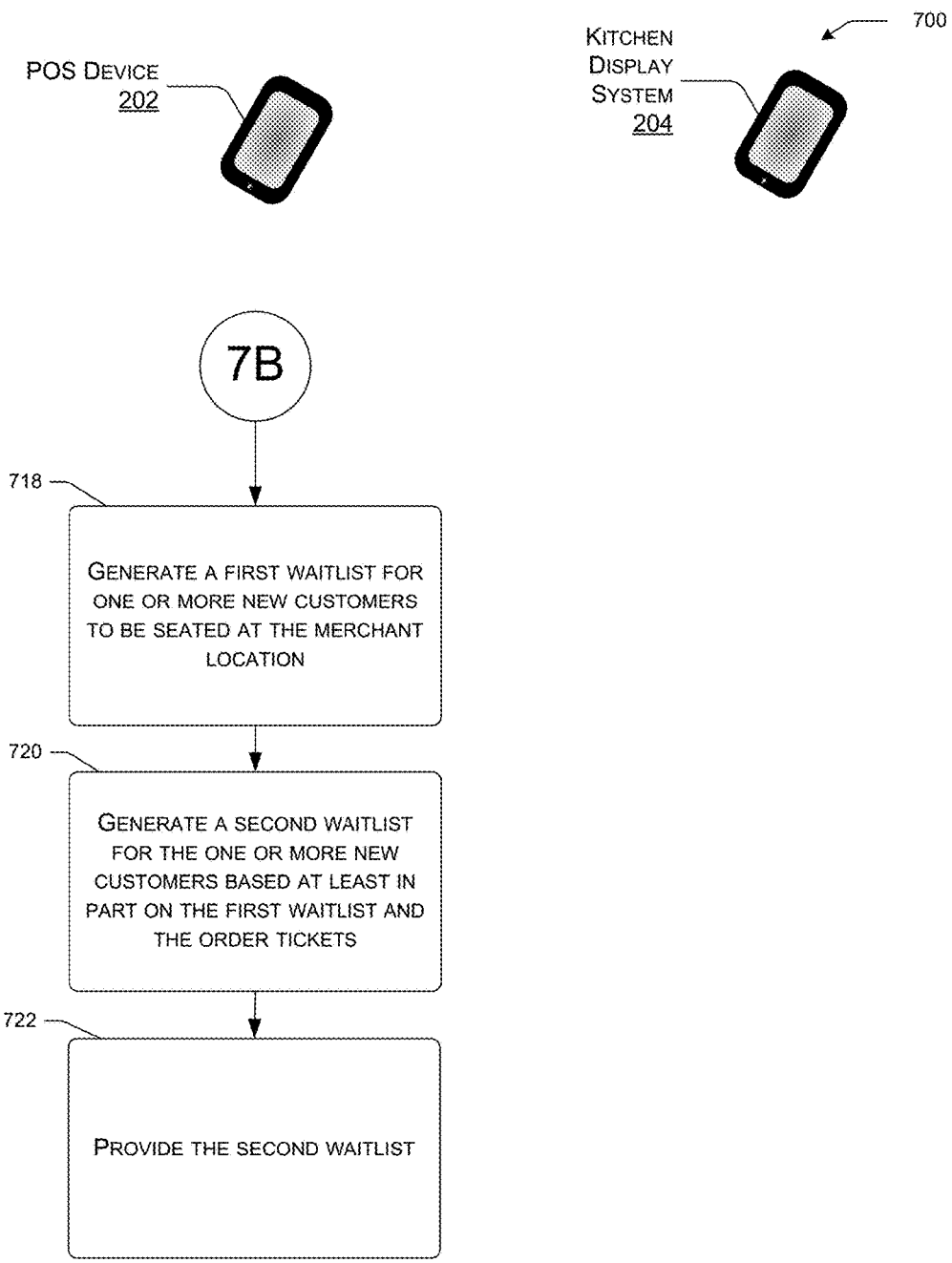

FIGS. 7A-7C are a flow diagram illustrating an example process for synchronizing kitchen display system functionality with point-of-sale (POS) waitlist generation. The process 700 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 700, and other processes described herein, may be performed by a POS device (e.g., POS device 202), a kitchen display system (e.g., kitchen display system 204), a third-party service (e.g., computing device(s) 112), by another entity, or by a combination thereof.

At 702, the POS device 202 receives input corresponding to a transaction between a merchant and customers. For instance, the POS device 202 can receive input indicating times that the customers were seated at tables in the merchant's location. Additionally, the POS device 202 can receive input indicating items ordered by the customers during the transactions.

At 704, the POS device 202 generates open tickets for the transactions, an individual open ticket of the open tickets being associated with one or more customers at a specific location within a merchant location. For instance, the POS device 202 can generate an open ticket for each of the transactions with the customers. Each open ticket can be associated with a specific location in the merchant's location, such as a table, seat, location, or the like. The POS device 202 can then add items to the open tickets based on the items ordered by the customers.

At 706, the POS device 202 sends, to a kitchen display system 204, first data associated with the open tickets and at 708, the kitchen display system 204 receives, from the POS device 202, the first data associated with the open tickets. For instance, the POS device 202 can send the kitchen display system 204 data indicating items that customers ordered during the transactions. In some examples, the data can further indicate identities of the open tickets, identities of customers associated with the open tickets, or the like. In some examples, the POS device 202 can send the kitchen display system 204 the data based on receiving the input associated with the transactions, receiving an indication to send the data, or at given time intervals.

At 710, the kitchen display system 204 generates order tickets based at least in part on the first data, an individual order ticket of the order tickets being associated with an open ticket. For instance, the kitchen display system 204 can generate an order ticket for each or the open tickets that has items that are "in-progress" of being prepared by the merchant. Each order ticket can include an identity of the open ticket, a length of time that the order ticket has been "in-progress" of being complete, and the items that are "in-progress" of being complete.

At 712, the kitchen display system 204 presents the order tickets. For instance, the kitchen display system 204 can display a kitchen display user interface. The kitchen display system 204 can then add the order tickets to the kitchen display user interface. In some examples, the kitchen display system 204 can receive input via the kitchen display user interface that indicates that one or more orders from the order tickets is complete. In such examples, the kitchen display system 204 removes the completed order tickets from the kitchen display user interface.

At 714, the kitchen display system 204 sends, to the POS device 202, second data associated with the order tickets and at 716, the POS device 202 receives, from the kitchen display system 204, the second data associated with the order tickets. For instance, the kitchen display system 204 can send the POS device 202 data that indicates a progress of each of the orders that the kitchen is currently preparing for the transactions. In some examples, the data can further indicate when the items will be completed by the kitchen. In some examples, kitchen display system 204 can then send the POS device 202 the data based on receiving input associated order tickets, at given time intervals, or the like.

At 718, the POS device 202 generates a first waitlist for one or more new customers to be seated at the merchant location. For instance, the POS device 202 can determine, based on the input associated with the transactions, that the merchant location is filled to capacity (e.g., all the tables are filled). Based on that determination, the POS device 202 can generate the waitlist for the merchant. In some examples, the POS device 202 generates the waitlist by calculating a wait time for each of the specific locations at the merchant location. In some examples, the POS device 202 can calculate a wait time for a respective location based on a time that customers were seated at the respective specific location and an average turn time for the respective specific location.

At 720, the POS device 202 generates a second waitlist for the one or more new customers based at least in part on the first waitlist and the order tickets. For instance, the POS device 202 can generate the second waitlist by updating the first waitlist based on the order tickets. In some examples, to update the waitlist based on the order tickets, the POS device 202 first uses the order tickets to determines a state for each of the transactions.

A state of a transaction can include one or more of (1) the customers were seated, (2) the customers made a drink order, (3) the drink order is "in progress" of being prepared (e.g., with estimated time remaining), (4) the drink order (and/or one or more drinks from the drink order) is ready to be delivered to the customers, (5) the customers received the drink order (and/or one or more drinks from the drink order), (6) the customers made a food order, (7) the food order is "in progress" of being prepared (e.g., with estimated time remaining), (8) the food order (and/or one or more items from the food order) is ready to be delivered to the customers, (9) the customers received the food order (and/or one or more items from the food order), (10) the customers received the ticket for the transaction, and/or (11) the POS device 202 processed the transaction.

After determining the states of the transactions, the POS device 202 can generate the second waitlist by updating the first waitlist using the states. Updating the first waitlist can include updating each of the wait times associated with each of the respective specific locations in the merchant location. For instance, the POS device 202 can generate the second waitlist by decreasing, increasing, or not changing each of the wait times within the waitlist.

At 722, the POS device can provide the second waitlist. For instance, the POS device 202 can display a POS user interface that includes one or more of the open tickets. The POS device 202 can then add the second waitlist to the POS user interface. In some examples, the merchant can utilize the POS user interface to manually update the waitlist based on various events. For instance, the merchant can utilize the POS user interface to updated the waitlist based on receiving customer reservations, customers canceling reservations, customers that are waiting to be seated ordering items, or the like.

In some examples, the POS device 202 can continue to receive input associated with transactions from the merchant and/or data from the kitchen display system 204 associated with updates to order tickets. The POS device 202 can continue updating waitlists based on both the input associated with the transactions and the updates to the order tickets. For instance, the POS device 202 can determine that one or more states of the transactions change over the course of the transactions using the updates to the order tickets. Based on the determination, the POS device 202 can update the waitlist. In some examples, the POS device 202 updates the waitlist in real-time using the updates to the order tickets.

Figure 8A:
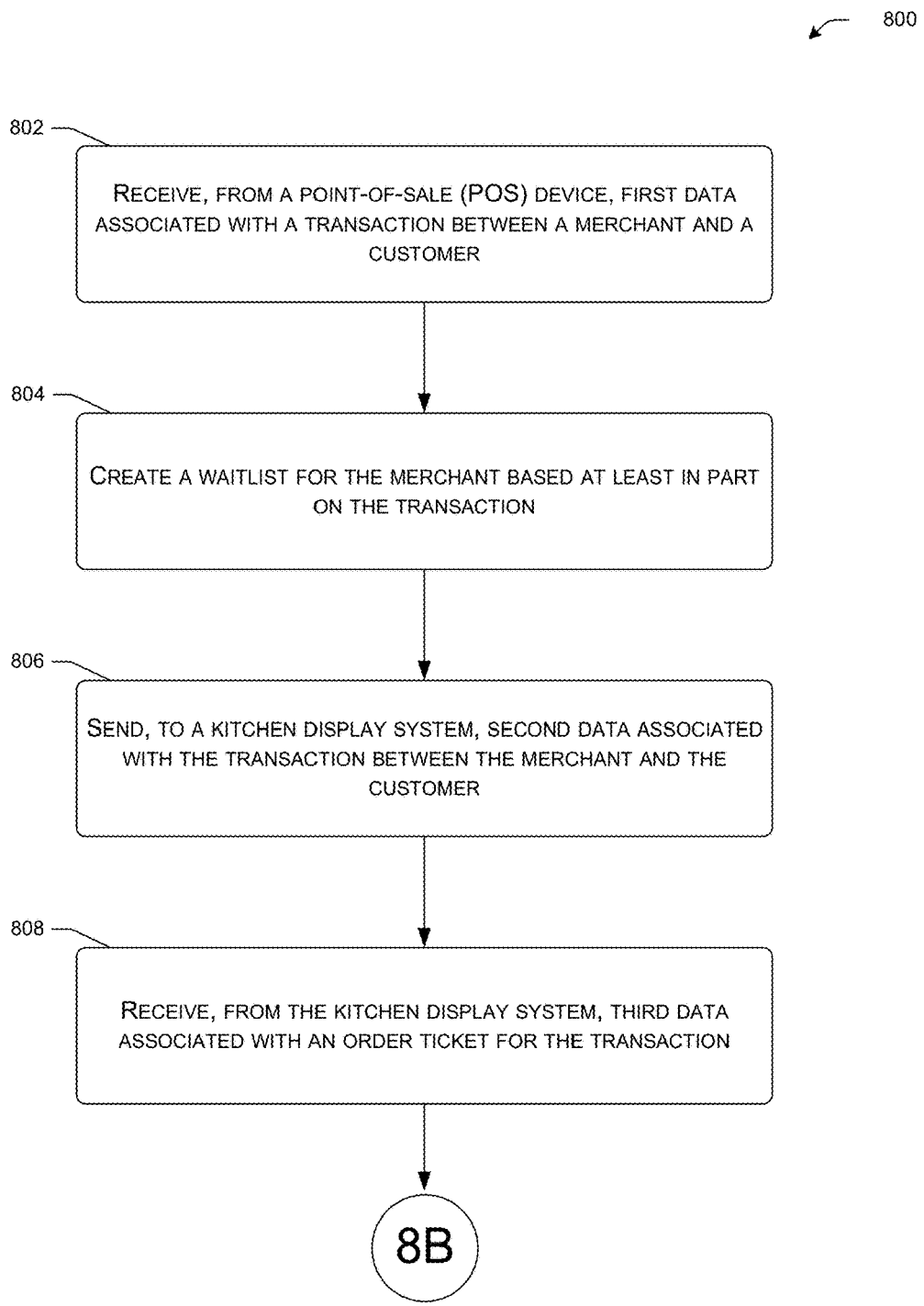
FIGS. 8A-8B are a flow diagram illustrating an example process for utilizing a third-party service to synchronize a POS device with a kitchen display system in order to generate waitlists.
Figure 8B:
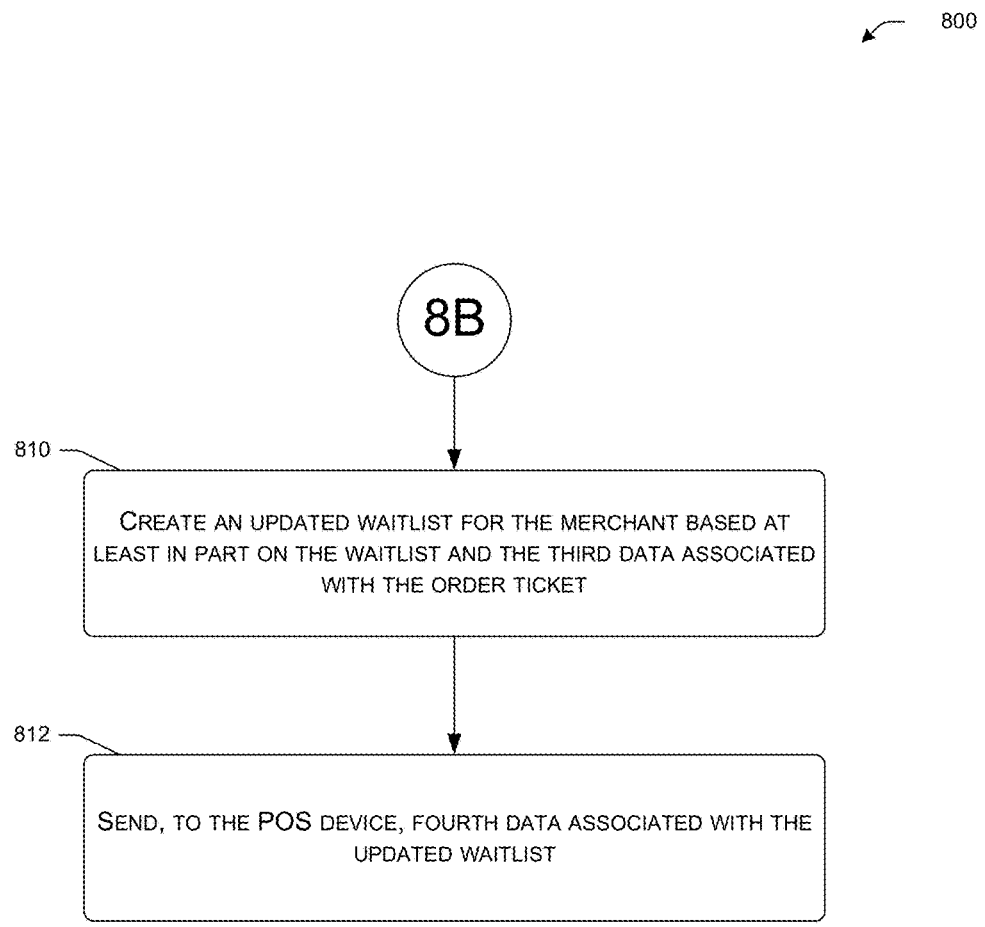

FIGS. 8A-8B are a flow diagram illustrating an example process for utilizing a third-party service to synchronize a POS device with a kitchen display system in order to generate waitlists. At 802, the process 800 receives, from a POS device, first data associated with a transaction between a merchant and a customer. For instance, a payment service (e.g., the computing device(s) 112) can receive the first data associated with the transaction from the POS device. In some examples, the first data can indicate an identity of the merchant, an identity of the customer, cart information (e.g., items ordered by the customers during the transaction), a time that the customer was seated, a time that the customer ordered items, or the like.

At 804, the process 800 creates a waitlist for the merchant based at least in part on the transaction. For instance, the payment service can determine, based on the first data, that the merchant location is filled to capacity (e.g., all the tables are filled). Based on that determination, the payment service can create the waitlist. In some examples, the payment service creates the waitlist by calculating a wait time for the transaction. In some examples, the payment service can calculate the wait time based on a time that the customer was seated at the merchant location and an average turn time for customers at the merchant's location.

At 806, the process 800 sends, to a kitchen display system, second data associated with the transaction between the merchant and the customer and at 808, the process 800 receives, from the kitchen display system, third data associated with an order ticket for the transaction. For instance, the payment service can send the kitchen display system second data indicating at least the items order by the customer. The payment service can then receive third data associated with an order ticket for the items from the kitchen display system. In some examples, the third data can indicate a time remaining for preparing the items for the customer.

At 810, the process 800 creates an updated waitlist for the merchant based at least in part on the waitlist and the third data associated with the order ticket. For instance, the payment service can create the updated waitlist by updating the waitlist based on the third data associated with the waitlist. To update the waitlist, the payment service can determine a state of the transaction using the third data associated with the order ticket. The payment service can then update the wait time included in the waitlist based on the state of the transaction.

At 812, the process 800 sends, to the POS device, fourth data associated with the updated waitlist. For instance, after generating the updated waitlist, the payment service can send the POS device fourth data associated with the updated waitlist. In some examples, the payment service can continue to receive data from the both the POS device and the kitchen display system, and update the updated waitlist based on the data. The payment service can then continue to send the POS device data associated with the updates.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a point-of-sale (POS) device for processing payments at a merchant location of a merchant, the POS device programmed to perform acts comprising:
   receiving input corresponding to transactions between the merchant and customers;
   generating open tickets for the transactions, an individual open ticket of the open tickets being associated with one or more customers located at a specific location within the merchant location and including:
   one or more items ordered by the one or more customers from the merchant; and
   an associated versioning data structure indicating a version of the individual open ticket; and
   sending, to a kitchen display system, first data associated with the open tickets;
   the kitchen display system for providing kitchen orders for the merchant, the kitchen display system programmed to perform acts comprising:
   receiving, from the POS device, the first data associated with the open tickets;
   generating order tickets based at least in part on the first data, an individual order ticket of the order tickets being associated with an open ticket and indicating items from the open ticket that are in-progress of being prepared by the merchant;
   presenting the order tickets; and
   sending, to the POS device, second data associated with the order tickets;
   and wherein the POS device is further programmed to perform acts comprising:
   generating, based at least in part on the input, a first waitlist for one or more new customers to be seated at the merchant location;
   receiving, from the kitchen display system, the second data associated with the order tickets;
   generating a second waitlist for the one or more new customers based at least in part on the first waitlist and the order tickets that the kitchen display system is currently providing; and
   providing the second waitlist for the one or more new customers.

2. The system of claim 1, wherein generating the second waitlist comprises updating the first waitlist based at least in part on the order tickets that the kitchen display system is currently providing.

3. The system of claim 1, wherein the POS device is further programmed to perform acts comprising determining, based at least in part on the open tickets and the order tickets, current states associated with the transactions, wherein a current state associated with a transaction includes at least one of:
   customers associated with the transaction are seated;
   the customers associated with the transaction ordered drink items;
   the drink items are ready to be delivered to the customers associated with the transaction;
   the customers associated with the transaction received the drink items;
   the customers associated with the transaction ordered food items;
   the food items are ready to be delivered to the customers associated with the transaction; or
   the food items have been delivered to the customers associated with the transaction;
   and wherein generating the second waitlist for the one or more new customers is based at least in part on the first waitlist and the current states associated with the transactions.

4. The system of claim 1, wherein:
   the kitchen display system is further programmed to perform acts comprising:

receiving input indicating that at least one of the order tickets has been completed by the merchant; and based at least in part on receiving the input indicating that at least one of the order tickets has been completed by the merchant, sending, to the POS device, third data indicating that the at least one of the order tickets has been completed; and the POS device is further programmed to perform acts comprising:

receiving the third data indicating that the at least one of the order tickets has been completed;

generating a third waitlist for the one or more new customers based at least in part on the second waitlist and the third data; and providing the third waitlist for the one or more new customers.

5. A point-of-sale (POS) device comprising:

one or more processors; and one or more computer-readable media storing instructions that, when executed by the one or more processors, cause the one or more processors to perform operations comprising:

receiving input corresponding to a transaction between a merchant and a first customer, the input indicating at least a time that the first customer was seated at a merchant location and one or more items ordered by the first customer from the merchant;

generating a ticket for the transaction, the ticket indicating the one or more items;

sending, to a kitchen display system, first data associated with the transaction, the first data indicating the one or more items from the ticket;

determining, based at least in part on the input, a waitlist time for a second customer to be seated at the merchant location of the merchant;

receiving, from the kitchen display system, second data associated with an order ticket for the transaction;

determining, based at least in part on the waitlist time and the order ticket, an updated waitlist time for the second customer to be seated at the merchant location of the merchant; and providing the updated waitlist time.

6. The POS device of claim 5, wherein determining the updated waitlist time comprises updating the waitlist time based at least in part on the order ticket.

7. The POS device of claim 5, wherein the second data associated with the order ticket indicates a time remaining for preparing the one or more items ordered by the first customer, and wherein determining the updated waitlist time comprises updating the waitlist time based at least in part on the time remaining.

8. The POS device of claim 5, where determining the waitlist time is further based at least in part on an average time that it takes for customers to conduct transactions with the merchant.

9. The POS device of claim 8, wherein:

the updated waitlist time is less than the waitlist time based at least in part on the order ticket indicating that the transaction is going to be shorter than the average time it takes for customers to conduct transactions with the merchant; or the updated waitlist time is greater than the waitlist time based at least in part on the order ticket indicating that the transaction is going to be longer than the average time it takes for customers to conduct transactions with the merchant.

10. The POS device of claim 5, the operations further comprising determining a state of the transaction based at least in part on the ticket and the order ticket, the state of the transaction including at least one of:

the first customer was seated;

the first customer ordered drinks;

the drinks are ready to be delivered to the first customer;

the first customer received the drinks;

the first customer ordered food;

the food is ready to be delivered to the first customer;

the first customer received the food; or the first customer received the ticket for processing, and wherein determining the updated waitlist time is further based at least in part on the state of the transaction.

11. The POS device of claim 5, the operations further comprising:

receiving, from the kitchen display system, third data associated with order tickets, an individual order ticket of the order tickets being associated with an additional transaction between the merchant and an additional customer, and wherein determining the updated waitlist time is further based at least in part on the third data associated with the order tickets.

12. The POS device of claim 5, wherein the ticket includes an associated versioning data structure indicating a version of the ticket, and wherein the operations further comprise:

receiving additional input corresponding to the transaction between the merchant and the first customer, the additional input indicating one or more additional items ordered by the first customer from the merchant;

updating the ticket based at least in part on the additional input, the ticket indicating the one or more item and the one or more additional items;

updating the associated versioning data based at least in part on updating the ticket;

sending, to the kitchen display system, third data associated with the transaction, the third data indicating the one or more additional items from the ticket;

receiving, from the kitchen display system, fourth data associated with an additional order ticket for the transaction;

updating, based at least in part on the additional order ticket, the updated waitlist time for the second customer to be seated at the merchant location of the merchant.

13. The POS device of claim 5, wherein:

the one or more items includes at least a first item and a second item;

the second data associated with the order ticket indicates that the first item includes a first preparation time and the second item includes a second preparation time; and determining the updated waitlist time is further based at least in part on a longer preparation time between the first preparation time and the second preparation time.

14. A payment service comprising:

one or more processors; and one or more computer-readable media storing instructions that, when executed by the one or more processors, cause the one or more processors to perform operations comprising:

receiving, from a point-of-sale (POS) device, first data associated with a transaction between a merchant and a customer;

creating a waitlist for the merchant based at least in part on the transaction, the waitlist including at least a first waitlist time for a potential new customer;

sending, to a kitchen display system, second data associated with the transaction between the merchant and the customer;

receiving, from the kitchen display system, third data associated with an order ticket for the transaction;

creating, based at least in part on the waitlist and the third data associated with the order ticket, an updated waitlist for the merchant, the updated waitlist including at least an updated first waitlist time for the potential new customer; and sending, to the POS device, fourth data associated with the updated waitlist.

15. The payment service of claim 14, wherein creating the updated waitlist comprises updating the waitlist for the merchant based at least in part on the order ticket.

16. The payment service of claim 14, wherein the third data associated with the order ticket indicates a time remaining for preparing items included in the transaction, and wherein creating the updated waitlist comprises updating the waitlist based at least in part on the time remaining.

17. The payment service of claim 14, wherein creating the waitlist is further based at least in part on an average time that it takes for customers to conduct transactions with the merchant.

18. The payment service of claim 14, the operations further comprising determining a state of the transaction based at least in part on the order ticket, the state of the transaction including at least one of:

the customer was seated;

the customer ordered drinks;

the drinks are ready to be delivered to the customer;

the customer received the drinks;

the customer ordered food;

the food is ready to be delivered to the customer; or the customer received the food;

and wherein creating the updated waitlist is further based at least in part on the state of the transaction.

19. The payment service of claim 14, the operations further comprising:

receiving, from the kitchen display system, fifth data associated with order tickets, an individual order ticket of the order tickets being associated with an additional transaction between the merchant and an additional customer, and wherein creating the updated waitlist is further based at least in part on the fifth data associated with the order tickets.

20. The payment service of claim 14, the operations further comprising:

receiving, from the kitchen display system, fifth data indicating that the order ticket for the transaction is complete;

updating the updated waitlist based at least in part on the fifth data; and sending, to the POS device, sixth data associated with updating the updated waitlist.

\* \* \* \* \*